(12) United States Patent
Choi et al.

(10) Patent No.: US 12,216,701 B2
(45) Date of Patent: Feb. 4, 2025

(54) VOICE-BASED CONTENT PROVIDING METHOD AND ELECTRONIC DEVICE THEREOF

(71) Applicant: Samsung Electronics Co., Ltd., Suwon-si (KR)

(72) Inventors: Jinho Choi, Suwon-si (KR); Kyounghoon Lee, Suwon-si (KR); Suneung Park, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 372 days.

(21) Appl. No.: 17/562,470

(22) Filed: Dec. 27, 2021

(65) Prior Publication Data

US 2022/0197937 A1 Jun. 23, 2022

Related U.S. Application Data

(63) Continuation of application No. PCT/KR2021/019755, filed on Dec. 23, 2021.

(30) Foreign Application Priority Data

Dec. 23, 2020 (KR) .......................... 10-2020-0182208

(51) Int. Cl.
*G06F 16/483* (2019.01)
*G10L 15/00* (2013.01)
*H04L 67/10* (2022.01)

(52) U.S. Cl.
CPC ............ *G06F 16/483* (2019.01); *H04L 67/10* (2013.01); *G10L 15/00* (2013.01)

(58) Field of Classification Search
CPC .... G06F 16/483; G06F 3/16; G06F 16/90332; H04L 67/10; H04L 67/306; G10L 15/00;
(Continued)

(56) References Cited

U.S. PATENT DOCUMENTS 9,552,816 B2   1/2017  Vanlund et al.
11,140,450 B2  10/2021 Yelton et al.
(Continued)

FOREIGN PATENT DOCUMENTS

JP    2007-240973 A    9/2007
JP    2018-506105 A    3/2018
(Continued)

OTHER PUBLICATIONS

International Search Report and Written Opinion dated Mar. 25, 2022, issued in International Patent Application No. PCT/KR2021/019755.
(Continued)

*Primary Examiner* — Michael Colucci
(74) *Attorney, Agent, or Firm* — Jefferson IP Law, LLP

(57) ABSTRACT

An electronic device including a microphone, a communication circuit, an output device including at least one of a speaker or a display, a processor operatively connected to the microphone, the communication circuit, and the output device, and a memory operatively connected to the processor are provided. The memory may store one or more instructions that, when executed, cause the processor to receive a voice input of a user through the microphone, to transmit the voice input and context information to an external server through the communication circuit, the context information including information about an application running on the electronic device, to receive a response for playing content corresponding to a category determined based on category priority information from among pieces of content matching a keyword included in the voice input, from the external server through the communication circuit, the category priority information being determined based on the context information, and to play the content through the output device.

17 Claims, 12 Drawing Sheets

(58) Field of Classification Search
CPC ......... G10L 15/02; G10L 15/22; G10L 15/30; G10L 2015/225; G10L 2015/228; G06Q 50/10; G11B 20/10
See application file for complete search history.

(56) References Cited

U.S. PATENT DOCUMENTS

| | | | |
|---|---|---|---|
| 11,432,045 | B2 | 8/2022 | Moon et al. |
| 11,494,443 | B2 | 11/2022 | Ahn et al. |
| 2008/0058972 | A1 | 3/2008 | Yoneda |
| 2008/0216122 | A1* | 9/2008 | Pong ............... H04N 21/47 725/37 |
| 2011/0060587 | A1* | 3/2011 | Phillips ............ G10L 15/30 704/235 |
| 2013/0325460 | A1 | 12/2013 | Kim et al. |
| 2017/0289595 | A1* | 10/2017 | Lewis ............. H04N 21/44226 |
| 2017/0300831 | A1* | 10/2017 | Gelfenbeyn ........ G06N 3/004 |
| 2017/0351767 | A1* | 12/2017 | Suzuki ............. G06F 16/686 |
| 2018/0053507 | A1* | 2/2018 | Wang ............... G10L 15/18 |
| 2019/0013024 | A1 | 1/2019 | Jeon et al. |
| 2019/0268661 | A1 | 8/2019 | Park et al. |
| 2019/0278553 | A1 | 9/2019 | Chishaki |
| 2019/0362718 | A1 | 11/2019 | Bhargava et al. |
| 2020/0021620 | A1* | 1/2020 | Puratheppparambil ........ H04L 63/102 |
| 2020/0092701 | A1* | 3/2020 | Arnberg ............ H04L 67/306 |
| 2021/0042362 | A1 | 2/2021 | Ahn et al. |
| 2021/0065716 | A1 | 3/2021 | Jeon et al. |
| 2022/0155946 | A1* | 5/2022 | Sharifi ............. H04B 17/318 |
| 2022/0360856 | A1 | 11/2022 | Moon et al. |

FOREIGN PATENT DOCUMENTS

| | | |
|---|---|---|
| JP | 2019-158933 A | 9/2019 |
| KR | 10-1944414 B1 | 1/2019 |
| KR | 10-2019-0143210 A | 12/2019 |
| KR | 10-2020-0022932 A | 3/2020 |
| KR | 10-2020-0094162 A | 8/2020 |
| KR | 10-2254894 B1 | 5/2021 |
| KR | 10-2423058 B1 | 7/2022 |
| KR | 10-2468214 B1 | 11/2022 |
| WO | 2016/190210 A1 | 12/2016 |
| WO | 2019/151804 A1 | 8/2019 |

OTHER PUBLICATIONS

European Office Action dated Dec. 8, 2023, issued in European Patent Application No. 21843867.9-1203.
Extended European Search Report dated Nov. 23, 2022, issued in European Patent Application No. 21843867.9-1203.

* cited by examiner

VOICE-BASED CONTENT PROVIDING METHOD AND ELECTRONIC DEVICE THEREOF

CROSS-REFERENCE TO RELATED APPLICATION(S)

This application is a continuation application, claiming priority under § 365(c), of an International application No. PCT/KR2021/019755, filed on Dec. 23, 2021, which is based on and claims the benefit of a Korean patent application number 10-2020-0182208, filed on Dec. 23, 2020, in the Korean Intellectual Property Office, the disclosure of which is incorporated by reference herein in its entirety.

BACKGROUND

Technical Field

The disclosure relates to a voice-based content providing a method and an electronic device thereof.

Background Art

Nowadays, media content is consumed on a daily basis by using devices equipped with a voice artificial intelligence technology. For example, a user may execute a corresponding application on an electronic device to listen to music or watch videos and then may directly search for content. In addition, on the basis of the voice command, the user may easily control the electronic device receiving a voice command or another electronic device capable of outputting content and then may allow the other electronic device to play content.

The above information is presented as background information only to assist with an understanding of the disclosure. No determination has been made, and no assertion is made, as to whether any of the above might be applicable as prior art with regard to the disclosure.

DISCLOSURE

Technical Problem

Media content is not limited to one format and may include data in various formats. For example, there may be content in various formats such as music, video, an image, or a website, which has the same title. When a user commands the playback of content by calling a title with voice, the category (or type), to which content requested by the user belongs, from among the plurality of content is unclear, and thus an electronic device needs to determine the user's intent to execute the corresponding command.

For example, when the user's intent is included in a domain that provides content of various categories rather than a domain that provides only a single category of content, the user's intent needs to be accurately determined.

Aspects of the disclosure are to address at least the above-mentioned problems and/or disadvantages and to provide at least the advantages described below. Accordingly, an aspect of the disclosure is to provide a voice-based content providing method of an electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a microphone, a communication circuit, an output device including at least one of a speaker or a display, a processor operatively connected to the microphone, the communication circuit, and the output device, and a memory operatively connected to the processor. The memory may store one or more instructions that, when executed, cause the processor to receive a voice input of a user through the microphone, to transmit the voice input and context information to an external server through the communication circuit, the context information including information about an application running on the electronic device, to receive a response to play content corresponding to a category determined based on category priority information from among a plurality of content matching a keyword included in the voice input, from the external server through the communication circuit, the category priority information being determined based on the context information, and to play the content through the output device.

In accordance with another aspect of the disclosure, an electronic device is provided. The electronic device includes a microphone, an output device including at least one of a speaker or a display, a processor operatively connected to the microphone and the output device, and a memory operatively connected to the processor. The memory may store one or more instructions that, when executed, cause the processor to receive a voice input of a user through the microphone, to determine a priority between a plurality of categories respectively corresponding to a plurality of content matching a keyword included in the voice input based on context information including information about an application running on the electronic device, to determine one category among the plurality of categories based on category priority information, and to play content corresponding to the determined category through the output device.

In accordance with another aspect of the disclosure, a voice-based content providing method of an electronic device is provided. The voice-based content providing method includes receiving a voice input of a user through a microphone, transmitting the voice input and context information including information about an application running on the electronic device, to an external server through a communication circuit, receiving a response to play content corresponding to a category determined based on category priority information from among a plurality of content matching a keyword included in the voice input through the communication circuit, and playing the content through an output device including at least one of a speaker or a display.

Advantageous Effects

According to various embodiments disclosed in the specification, it is possible to provide a voice-based content providing method capable of playing content of a category intended by a user even when the category of content is incapable of being determined from the user's voice input, and an electronic device thereof.

Besides, a variety of effects directly or indirectly understood through the specification may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
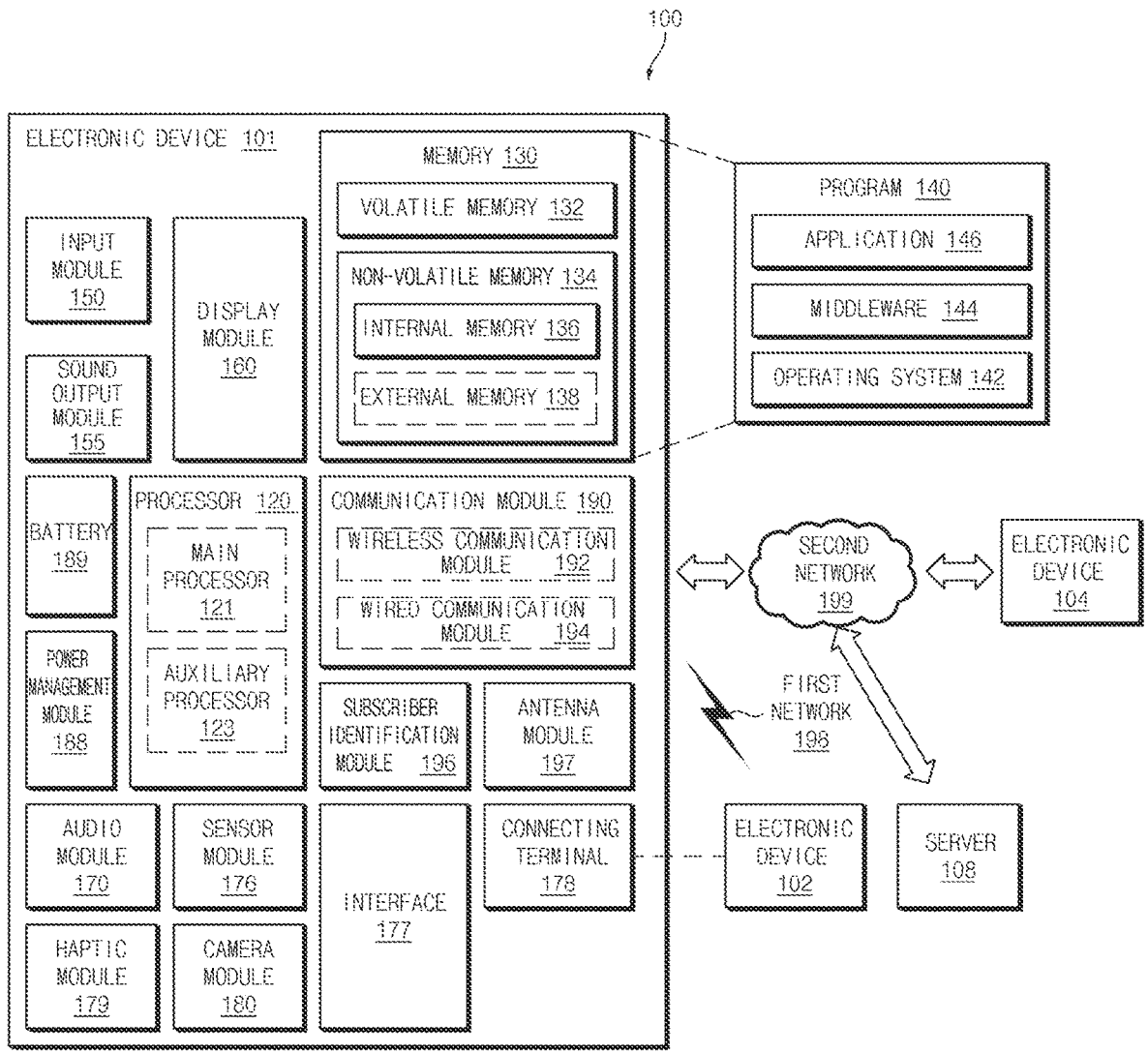
FIG. 1A is a block diagram of an electronic device in a network environment, according to an embodiment of the disclosure.

FIG. 1A is a block diagram illustrating an electronic device in a network environment 100 according to an embodiment of the disclosure.

Referring to FIG. 1A, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 1B:
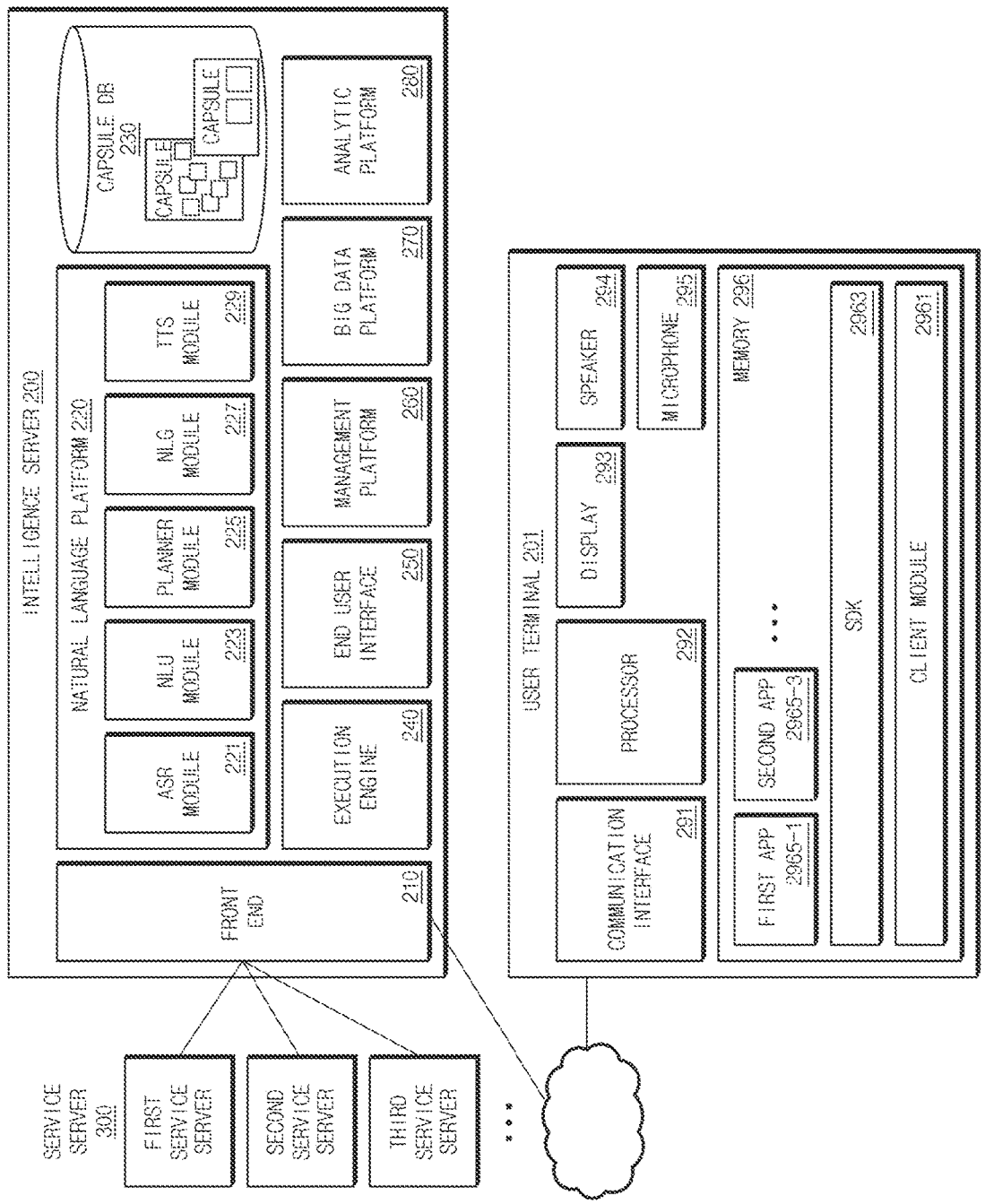
FIG. 1B is a block diagram illustrating an integrated intelligence system, according to an embodiment of the disclosure.

FIG. 1B is a block diagram illustrating an integrated intelligence system, according to an embodiment of the disclosure.

Referring to FIG. 1B, an integrated intelligence system according to an embodiment may include a user terminal 201 (e.g., an electronic device 101 of FIG. 1A), an intelligence server 200, and a service server 300.

The user terminal 201 according to an embodiment may be a terminal device (or an electronic device) capable of connecting to Internet, and may be, for example, a mobile phone, a smartphone, a personal digital assistant (PDA), a notebook computer, a television (TV), a white household appliance, a wearable device, a head mounted display (HMD), or a smart speaker.

According to the illustrated embodiment, the user terminal 201 may include a communication interface 291 (e.g., a communication circuit (e.g., communication module 190) of FIG. 1A), a microphone 295 (e.g., the input module 150 of FIG. 1A), a speaker 294 (e.g., the sound output module 155 of FIG. 1A), a display 293 (e.g., the display module 160 of FIG. 1A), a memory 296 (e.g., the memory 130 of FIG. 1A), or a processor 292 (e.g., the processor 120 of FIG. 1A). The listed components may be operatively or electrically connected to one another.

The communication interface 291 according to an embodiment may be connected to an external device and may be configured to transmit or receive data to or from the external device. The microphone 295 according to an embodiment may receive a sound (e.g., a user utterance) to convert the sound into an electrical signal. The speaker 294 according to an embodiment may output the electrical signal as sound (e.g., voice). The display 293 according to an embodiment may be configured to display an image or a video. The display 293 according to an embodiment may display the graphic user interface (GUI) of the running app (or an application program).

The memory 296 according to an embodiment may store a client module 2961, a software development kit (SDK) 2963, and a plurality of apps 2965. The client module 2961 and the SDK 2963 may constitute a framework (or a solution program) for performing general-purposed functions. Furthermore, the client module 2961 or the SDK 2963 may constitute the framework for processing a voice input.

The plurality of apps 2965 may be programs for performing a specified function. According to an embodiment, the plurality of apps 2965 may include a first app 2965-1 and/or a second app 2965-3. According to an embodiment, each of the plurality of apps 2965 may include a plurality of actions for performing a specified function. For example, the apps may include an alarm app, a message app, and/or a schedule app. According to an embodiment, the plurality of apps 2965 may be executed by the processor 292 to sequentially execute at least part of the plurality of actions.

According to an embodiment, the processor 292 may control overall operations of the user terminal 201. For example, the processor 292 may be electrically connected to the communication interface 291, the microphone 295, the speaker 294, and the display 293 so as to perform a specified operation. For example, the processor 292 may include at least one processor.

Moreover, the processor 292 according to an embodiment may execute the program stored in the memory 296 so as to perform a specified function. For example, according to an embodiment, the processor 292 may execute at least one of the client module 2961 or the SDK 2963 so as to perform a following operation for processing a voice input. The processor 292 may control operations of the plurality of apps 2965 via the SDK 2963. The following actions described as the actions of the client module 2961 or the SDK 2963 may be the actions performed by the execution of the processor 292.

According to an embodiment, the client module 2961 may receive a voice input. For example, the client module 2961 may receive a voice signal corresponding to a user utterance detected through the microphone 295. The client module 2961 may transmit the received voice input (e.g., a voice input) to the intelligence server 200. The client module 2961 may transmit state information of the user terminal 201 to the intelligence server 200 together with the received voice input. For example, the state information may be execution state information of an app.

According to an embodiment, the client module 2961 may receive a result corresponding to the received voice input. For example, when the intelligence server 200 is capable of calculating the result corresponding to the received voice input, the client module 2961 may receive the result corresponding to the received voice input. The client module 2961 may display the received result on the display 293.

According to an embodiment, the client module 2961 may receive a plan corresponding to the received voice input. The client module 2961 may display, on the display 293, a result of executing a plurality of actions of an app depending on the plan. For example, the client module 2961 may sequentially display the result of executing the plurality of actions on a display. For another example, the user terminal 201 may display only a part of results (e.g., a result of the last action) of executing the plurality of actions, on the display.

According to an embodiment, the client module 2961 may receive a request for obtaining information necessary to calculate the result corresponding to a voice input, from the intelligence server 200. According to an embodiment, the client module 2961 may transmit the necessary information to the intelligence server 200 in response to the request.

According to an embodiment, the client module 2961 may transmit, to the intelligence server 200, information about the result of executing a plurality of actions depending on the plan. The intelligence server 200 may identify that the received voice input is correctly processed, using the result information.

According to an embodiment, the client module 2961 may include a speech recognition module. According to an embodiment, the client module 2961 may recognize a voice input for performing a limited function, via the speech recognition module. For example, the client module 2961 may launch an intelligence app for processing a specific voice input by performing an organic action, in response to a specified voice input (e.g., wake up!).

According to an embodiment, the intelligence server 200 may receive information associated with a user's voice input from the user terminal 201 over a communication network. According to an embodiment, the intelligence server 200 may convert data associated with the received voice input to text data. According to an embodiment, the intelligence server 200 may generate at least one plan for performing a task corresponding to the user's voice input, based on the text data.

According to an embodiment, the plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. According to an embodiment, the plan may be selected from a set of predefined plans or may be generated in real time in response to a user's request. For example, the AI system may select at least one plan of the plurality of predefined plans.

According to an embodiment, the intelligence server 200 may transmit a result according to the generated plan to the user terminal 201 or may transmit the generated plan to the user terminal 201. According to an embodiment, the user terminal 201 may display the result according to the plan, on a display. According to an embodiment, the user terminal 201 may display a result of executing the action according to the plan, on the display.

The intelligence server 200 according to an embodiment may include a front end 210, a natural language platform 220, a capsule database 230, an execution engine 240, an end user interface 250, a management platform 260, a big data platform 270, or an analytic platform 280.

According to an embodiment, the front end 210 may receive a voice input received from the user terminal 201.

The front end 210 may transmit a response corresponding to the voice input to the user terminal 201.

According to an embodiment, the natural language platform 220 may include an automatic speech recognition (ASR) module 221, a natural language understanding (NLU) module 223, a planner module 225, a natural language generator (NLG) module 227, and/or a text to speech module (TTS) module 229.

According to an embodiment, the ASR module 221 may convert the voice input received from the user terminal 201 into text data. According to an embodiment, the NLU module 223 may grasp the intent of the user, using the text data of the voice input. For example, the NLU module 223 may grasp the intent of the user by performing syntactic analysis or semantic analysis. According to an embodiment, the NLU module 223 may grasp the meaning of words extracted from the voice input by using linguistic features (e.g., syntactic elements) such as morphemes or phrases and may determine the intent of the user by matching the grasped meaning of the words to the intent.

According to an embodiment, the planner module 225 may generate the plan by using a parameter and the intent that is determined by the NLU module 223. According to an embodiment, the planner module 225 may determine a plurality of domains necessary to perform a task, based on the determined intent. The planner module 225 may determine a plurality of actions included in each of the plurality of domains determined based on the intent. According to an embodiment, the planner module 225 may determine the parameter necessary to perform the determined plurality of actions or a result value output by the execution of the plurality of actions. The parameter and the result value may be defined as a concept of a specified form (or class). As such, the plan may include the plurality of actions and/or a plurality of concepts, which are determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine an execution sequence of the plurality of actions, based on the parameters necessary to perform the plurality of actions and the result output by the execution of the plurality of actions. Accordingly, the planner module 225 may generate a plan including information (e.g., ontology) about the relationship between the plurality of actions and the plurality of concepts. The planner module 225 may generate the plan, using information stored in the capsule DB 230 storing a set of relationships between concepts and actions.

According to an embodiment, the NLG module 227 may change specified information into information in a text form. The information changed to the text form may be in the form of a natural language speech. The TTS module 229 according to an embodiment may change information in the text form to information in a voice form.

According to an embodiment, all or part of the functions of the natural language platform 220 may be also implemented in the user terminal 201.

The capsule DB 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule DB 230 may store the plurality of capsules in a form of a concept action network (CAN). According to an embodiment, the plurality of capsules may be stored in the function registry included in the capsule DB 230.

The capsule DB 230 may include a strategy registry that stores strategy information necessary to determine a plan corresponding to a voice input. When there are a plurality of plans corresponding to the voice input, the strategy information may include reference information for determining one plan. According to an embodiment, the capsule DB 230 may include a follow-up registry that stores information of the follow-up action for suggesting a follow-up action to the user in a specified context. For example, the follow-up action may include a follow-up utterance. According to an embodiment, the capsule DB 230 may include a layout registry storing layout information of information output via the user terminal 201. According to an embodiment, the capsule DB 230 may include a vocabulary registry storing vocabulary information included in capsule information. According to an embodiment, the capsule DB 230 may include a dialog registry storing information about dialog (or interaction) with the user. The capsule DB 230 may update an object stored via a developer tool. For example, the developer tool may include a function editor for updating an action object or a concept object. The developer tool may include a vocabulary editor for updating a vocabulary. The developer tool may include a strategy editor that generates and registers a strategy for determining the plan. The developer tool may include a dialog editor that creates a dialog with the user. The developer tool may include a follow-up editor capable of activating a follow-up target and editing the follow-up utterance for providing a hint. The follow-up target may be determined based on a target, the user's preference, or an environment condition, which is currently set. The capsule DB 230 according to an embodiment may be also implemented in the user terminal 201.

According to an embodiment, the execution engine 240 may calculate a result by using the generated plan. The end user interface 250 may transmit the calculated result to the user terminal 201. Accordingly, the user terminal 201 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage quality of service (QoS) of the intelligence server 200. For example, the analytic platform 280 may manage the component and processing speed (or efficiency) of the intelligence server 200.

According to an embodiment, the service server 300 may provide the user terminal 201 with a specified service (e.g., ordering food or booking a hotel). According to an embodiment, the service server 300 may be a server operated by the third party. According to an embodiment, the service server 300 may provide the intelligence server 200 with information for generating a plan corresponding to the received voice input. The provided information may be stored in the capsule DB 230. Furthermore, the service server 300 may provide the intelligence server 200 with result information according to the plan.

In the above-described integrated intelligence system, the user terminal 201 may provide the user with various intelligent services in response to a user input. The user input may include, for example, an input through a physical button, a touch input, or a voice input.

According to an embodiment, the user terminal 201 may provide a speech recognition service via an intelligence app (or a speech recognition app) stored therein. In this case, for example, the user terminal 201 may recognize a user utterance or a voice input, which is received via the microphone, and may provide the user with a service corresponding to the recognized voice input.

According to an embodiment, the user terminal 201 may perform a specified action, based on the received voice input, independently, or together with the intelligence server and/or the service server. For example, the user terminal 201 may launch an app corresponding to the received voice input and may perform the specified action via the executed app.

According to an embodiment, when providing a service together with the intelligence server 200 and/or the service server 300, the user terminal 201 may detect a user utterance by using the microphone 295 and may generate a signal (or voice data) corresponding to the detected user utterance. The user terminal may transmit the voice data to the intelligence server 200 by using the communication interface 291.

According to an embodiment, the intelligence server 200 may generate a plan for performing a task corresponding to the voice input or the result of performing an action depending on the plan, as a response to the voice input received from the user terminal 201. For example, the plan may include a plurality of actions for performing the task corresponding to the voice input of the user and/or a plurality of concepts associated with the plurality of actions. The concept may define a parameter to be input upon executing the plurality of actions or a result value output by the execution of the plurality of actions. The plan may include relationship information between the plurality of actions and/or the plurality of concepts.

According to an embodiment, the user terminal 201 may receive the response by using the communication interface 291. The user terminal 201 may output the voice signal generated in the user terminal 201 to the outside by using the speaker 294 or may output an image generated in the user terminal 201 to the outside by using the display 293.

In FIG. 1B, it is described that speech recognition of a voice input received from the user terminal 201, understanding and generating a natural language, and calculating a result by using a plan are performed on the intelligence server 200. However, various embodiments of the disclosure are not limited thereto. For example, at least part of configurations (e.g., the natural language platform 220, the execution engine 240, and the capsule DB 230) of the intelligence server 200 may be embedded in the user terminal 201, and the operation thereof may be performed by the user terminal 201.

Figure 2:
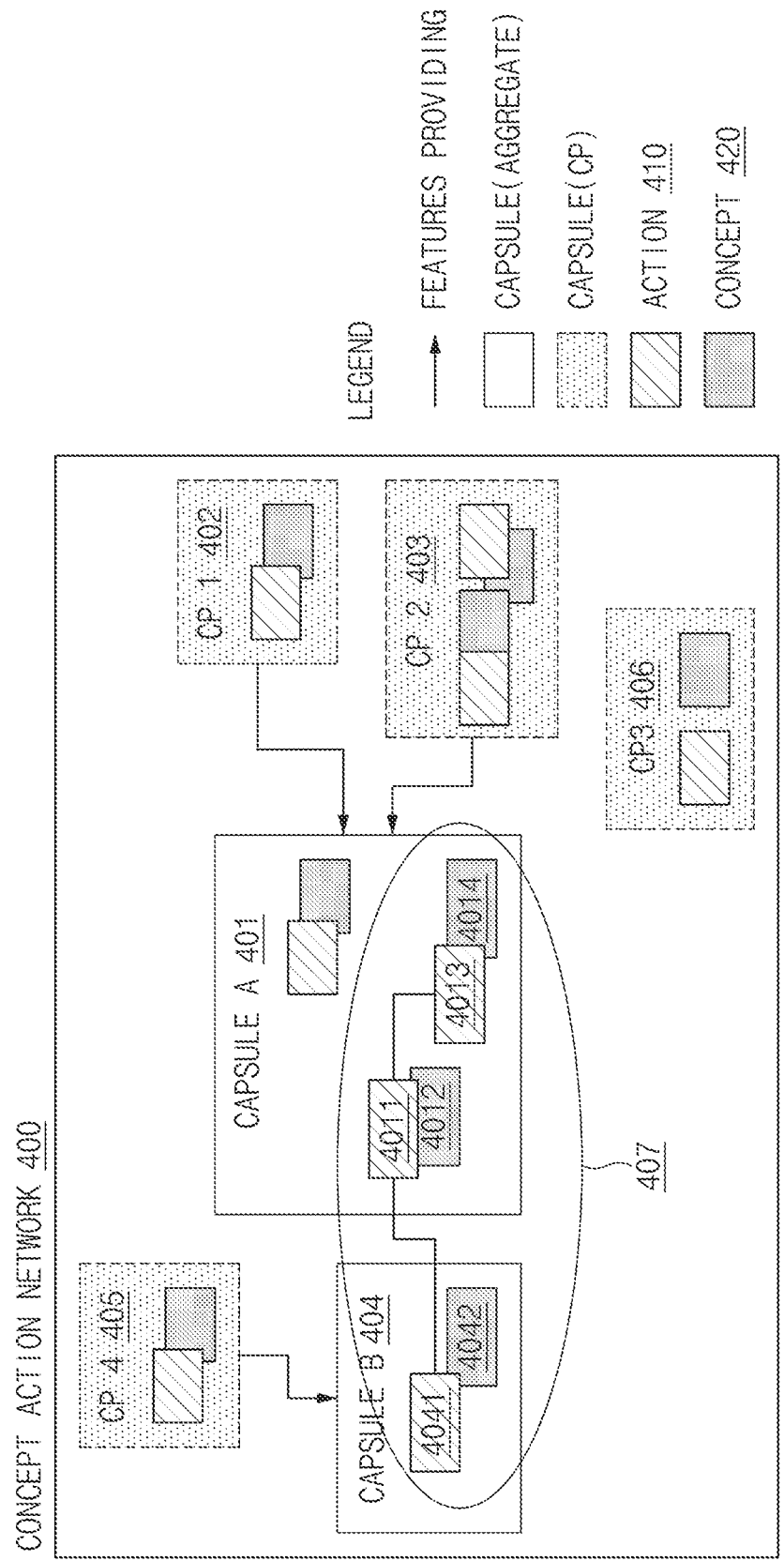
FIG. 2 is a diagram illustrating the form in which relationship information between a concept and an action is stored in a database, according to an embodiment of the disclosure.

FIG. 2 is a diagram illustrating a form in which relationship information between a concept and an action is stored in a database, according to an embodiment of the disclosure.

Referring to FIG. 2, a capsule database (e.g., a capsule DB 230) of an intelligence server 200 may store a capsule in the form of a CAN (e.g., CAN 400). The capsule DB may store an action for processing a task corresponding to a user's voice input and a parameter necessary for the action, in a form of CAN.

The capsule DB may store a plurality capsules (a capsule A 401 and a capsule B 404) respectively corresponding to a plurality of domains (e.g., applications). According to an embodiment, a single capsule (e.g., the capsule A 401) may correspond to a single domain (e.g., a location (geo) or an application). Furthermore, at least one service provider (e.g., CP 1 402, CP 2 403, CP3 406, or CP4 405) for performing a function for a domain associated with the capsule may correspond to one capsule. According to an embodiment, the single capsule may include at least one or more actions 410 and at least one or more concepts 420 for performing a specified function.

The natural language platform 220 may generate a plan for performing a task corresponding to the received voice input, using the capsule stored in a capsule database. For example, the planner module 225 of the natural language platform may generate the plan by using the capsule stored in the capsule database. For example, a plan 407 may be generated by using actions 4011 and 4013 and concepts 4012 and 4014 of the capsule A 401 and an action 4041 and a concept 4042 of the capsule B 404.

Figure 3:
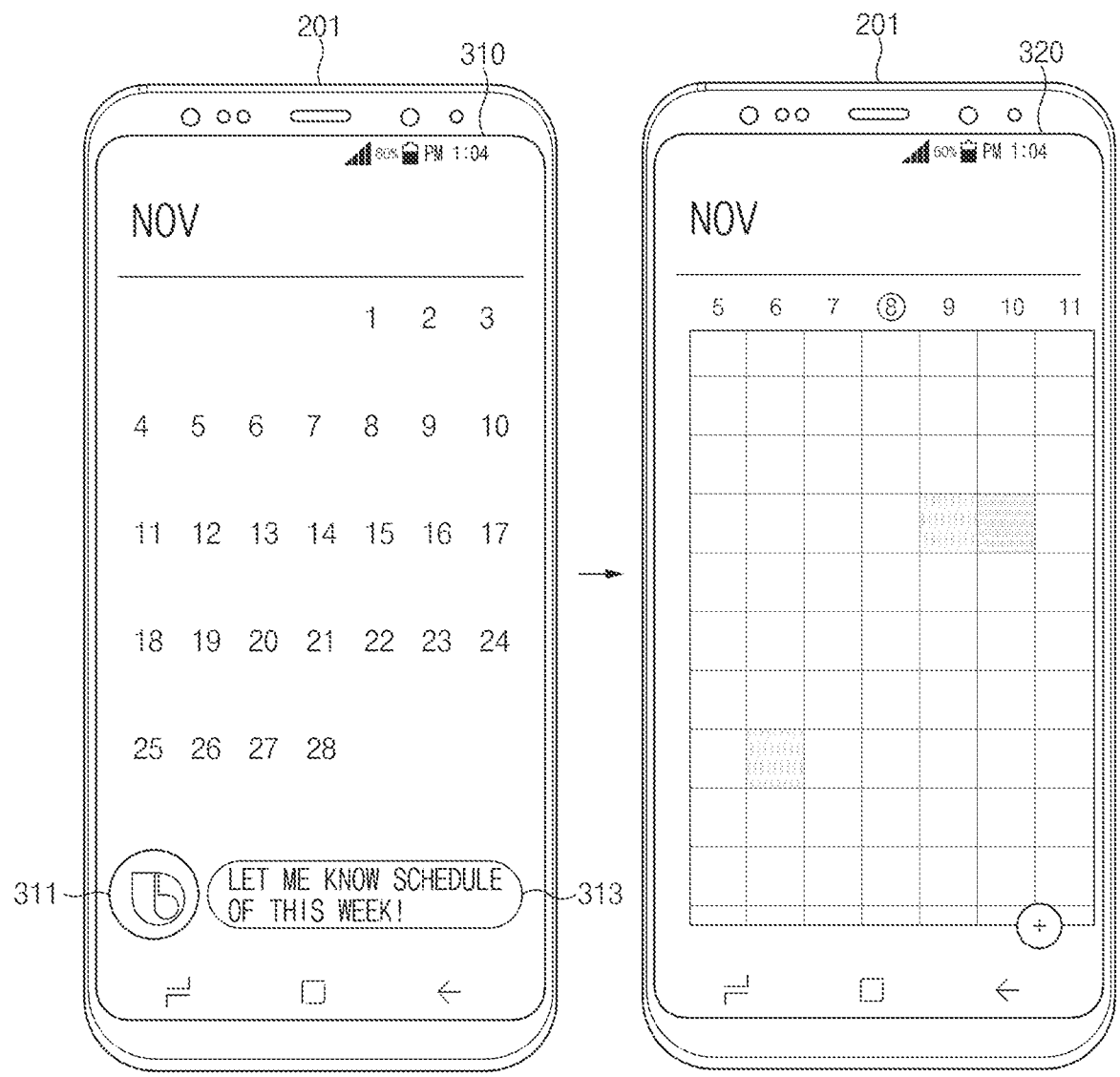
FIG. 3 is a view illustrating a user terminal displaying a screen of processing a voice input received through an intelligence app, according to an embodiment of the disclosure.

FIG. 3 is a view illustrating a screen in which a user terminal processes a voice input received through an intelligence app, according to an embodiment of the disclosure.

Referring to FIG. 3, a user terminal 201 may execute an intelligence app to process a user input through an intelligence server 200.

According to an embodiment, on screen 310, when recognizing a specified voice input (e.g., wake up!) or receiving an input via a hardware key (e.g., a dedicated hardware key), the user terminal 201 may launch an intelligence app for processing a voice input. For example, the user terminal 201 may launch the intelligence app in a state where a schedule app is executed. According to an embodiment, the user terminal 201 may display an object (e.g., an icon) 311 corresponding to the intelligence app, on the display 293. According to an embodiment, the user terminal 201 may receive a voice input by a user utterance. For example, the user terminal 201 may receive a voice input saying that "let me know the schedule of this week!" According to an embodiment, the user terminal 201 may display a user interface (UI) 313 (e.g., an input window) of the intelligence app, in which text data of the received voice input is displayed, on a display.

According to an embodiment, on screen 320, the user terminal 201 may display a result corresponding to the received voice input, on the display. For example, the user terminal 201 may receive a plan corresponding to the received user input and may display 'the schedule of this week' on the display depending on the plan.

Hereinafter, a configuration and operation of an electronic device and an intelligence server according to an embodiment will be described with reference to FIG. 4A.

Figure 4A:
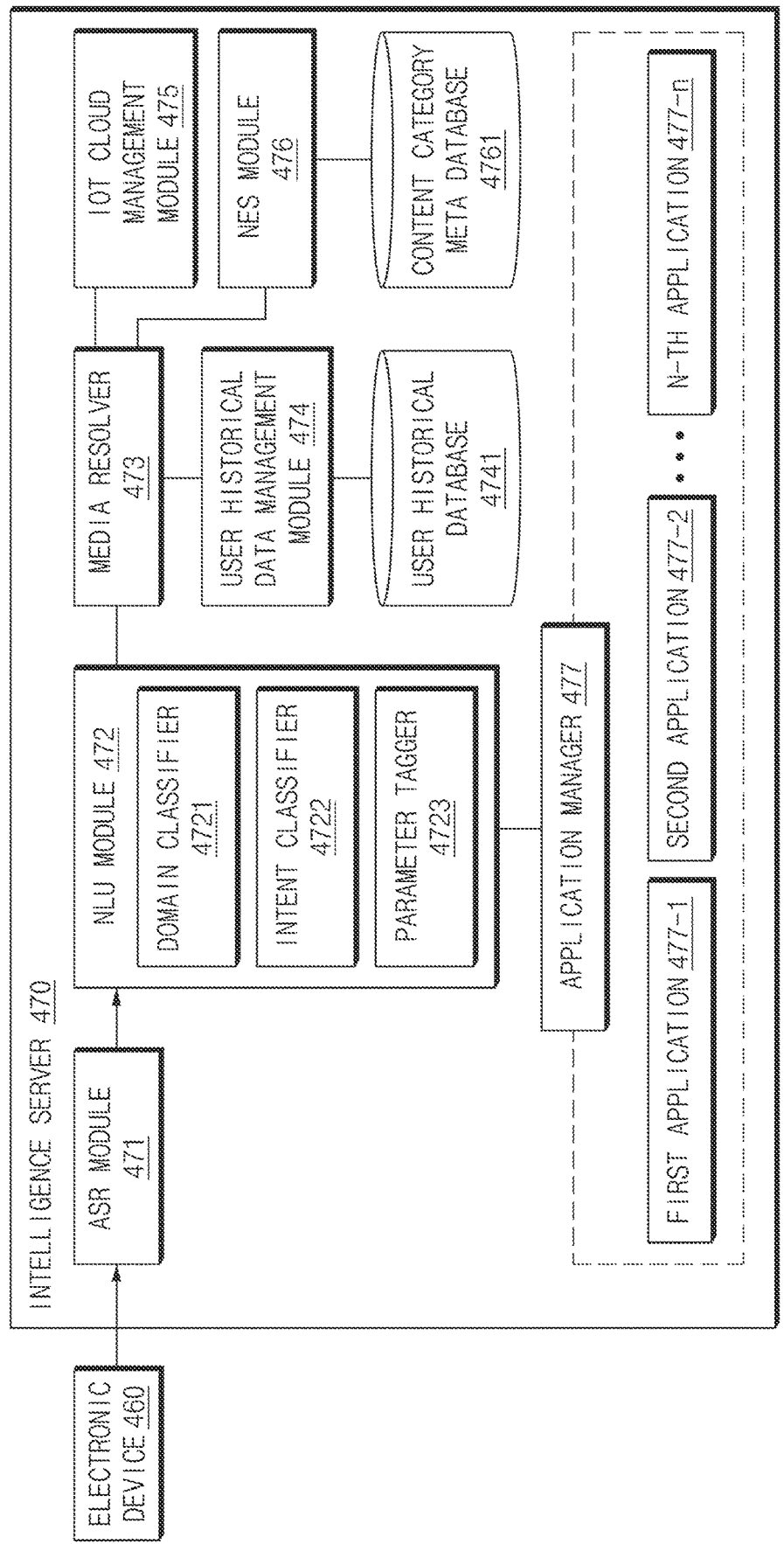
FIG. 4A is a block diagram illustrating an integrated intelligence system, according to an embodiment of the disclosure.

FIG. 4A is a block diagram illustrating an integrated intelligence system, according to an embodiment of the disclosure.

Referring to FIG. 4A depicting a block diagram 450, according to an embodiment, an integrated intelligence system may include an electronic device 460 and an intelligence server 470. According to an embodiment, the electronic device 460 may correspond to the user terminal 201 of FIG. 1B. The intelligence server 470 may correspond to the intelligence server 200 of FIG. 1B.

According to an embodiment, the electronic device 460 and the intelligence server 470 may communicate with each other over a network (e.g., the second network 199 of FIG. 1A).

According to an embodiment, the electronic device 460 may be a device having various types. For example, the electronic device 460 may include a portable communication device (e.g., a smartphone), a computer device, a portable multimedia device, a speaker, a wearable device, or a home appliance (e.g., a smart TV). An electronic device according to an embodiment of the disclosure may not be limited to the above-described electronic devices.

According to an embodiment, the electronic device 460 may receive a user's voice input (or an utterance). For example, the electronic device 460 may receive the user's voice input through a microphone (e.g., the microphone 295 of FIG. 1B).

According to an embodiment, the electronic device 460 may transmit the received user's voice input to the intelligence server 470 through a communication circuit (e.g., the communication interface 291 of FIG. 1B).

According to an embodiment, the intelligence server 470 may include an ASR module 471 (e.g., the ASR module 221 of FIG. 1B), an NLU module 472 (e.g., the NLU module 223 of FIG. 1B), a media resolver 473, a user historical data management module 474, an Internet of things (IoT) cloud management module 475, a named entity service (NES) module 476, and/or an application manager 477.

According to an embodiment, each module (e.g., the ASR module 471, the NLU module 472, the media resolver 473, the user historical data management module 474, the IoT cloud management module 475, the NES module 476, or the application manager 477) included in the intelligence server 470 may be implemented in software or hardware. In an embodiment, the modules may be a program, which is stored in a memory (not shown) of the intelligence server 470 and which is coded to perform a specified operation. The modules may include a plurality of instructions. For example, the modules may be loaded onto the processor of the intelligence server 470 and then may be executed. The processor of the intelligence server 470 may be configured to execute instructions of the modules.

According to an embodiment, the ASR module 471 may convert the user's voice input received from the electronic device 460 into text data. According to an embodiment, the NLU module 472 may grasp the user's intent by using the text data of the voice input. The ASR module 471 and the NLU module 472 are described with reference to FIG. 1B, and thus redundant descriptions will be omitted or simplified.

According to an embodiment, the NLU module 472 may include a domain classifier 4721, an intent classifier 4722, and/or a parameter tagger 4723.

According to an embodiment, the domain classifier 4721 may classify text data corresponding to a user utterance for each domain and then may deliver the classified text data to each domain processor (or a resolver corresponding to each domain). According to an embodiment, the domain may include various domains, which are capable of being processed by the intelligence server 470, such as a phone, a message, a gallery, media content, or a search.

Although not shown in FIG. 4A, according to an embodiment, the intelligence server 470 may include a plurality of resolvers corresponding to the various domains.

According to an embodiment, each of the plurality of resolvers (not shown) may be classified based on the lexical similarity (grammatical and semantic similarity) of trained utterances, or may be classified based on the similarity of functions (or services) associated with trained utterances.

For example, the media resolver 473 may be trained based on an utterance associated with media content playback (e.g., intended to receive a function for playing media content). As another example, the media resolver 473 may be trained based on an utterance associated with media control.

According to an embodiment, the domain classifier 4721 may deliver text data corresponding to a user utterance to a resolver, which corresponds to the received user utterance, from among resolvers trained with different types of utterances, thereby allowing a more suitable service corresponding to the user utterance to be provided to a user. The domain classifier 4721 may deliver the user's intent information and/or slot information, which is analyzed by the NLU module 472, to a resolver corresponding to the user utterance.

For example, when a result of analyzing text data indicates that it is determined that the user's utterance (or text data corresponding to the user utterance) belongs to a domain associated with the playback of content (e.g., media), the domain classifier 4721 may deliver the text data to the media resolver 473 among a plurality of resolvers.

According to an embodiment, the intent classifier 4722 may classify the user's intent by analyzing the text data.

According to an embodiment, the parameter tagger 4723 may tag words capable of being used as parameters by analyzing the text data. For example, the parameter tagger 4723 may tag a parameter to an identifier for identifying a sequence for performing a task corresponding to the user utterance.

For example, the media resolver 473 may extract a keyword associated with content from the text data and then may determine a category of content corresponding to the extracted keyword from among a plurality of categories. The keyword may correspond to at least part of the text data. In various embodiments disclosed in this specification, the keyword may mean a text for identifying and/or searching for content among parameters tagged by the parameter tagger 4723. For example, the keyword may include a parameter tagged to an identifier of a sequence for playing content. For example, the media resolver 473 may obtain the keyword by receiving the parameter tagged to the identifier of the sequence for playing content from the parameter tagger 4723, and then may determine a category of content corresponding to the obtained keyword. As another example, on the basis of a database (not shown) assigned to the media resolver 473, or a library (not shown) for interworking with a search server (not shown), the media resolver 473 may extract a keyword associated with content from text data and may determine a category. The media resolver 473 may store the text data corresponding to the user utterance received from the domain classifier 4721 in the database (not shown) assigned to the media resolver 473 or the library (not shown) for interworking with the search server (not shown). For example, the media resolver 473 may identify information (e.g., name information or keyword information) corresponding to at least part of text data from the database (not shown) assigned to the media resolver 473 and then may determine a category corresponding to the identified information. In this case, the media resolver 473 may obtain a search query for search based on text data, may transmit the obtained search query to the search server (not shown), and may obtain the found result (e.g., keyword information associated with content) in response to the obtained search query.

According to one embodiment, the media resolver 473 may determine the category of content matching a keyword and may determine an application capable of playing the content of the determined category. Here, the application may correspond to the capsule of FIGS. 1B and 2. For example, the application may include at least one of an application stored in a memory (e.g., the memory 296 in FIG. 1B) of the electronic device 460, a virtual application, and a web application. According to an embodiment, the category of content may mean the type or format of the content. For example, the category of content determined by the media resolver 473 may include music, video (e.g., movies, or TV programs (or TV shows)), and/or radio (or podcast).

According to an embodiment, the media resolver 473 may receive category information about a keyword from the NES module 476. According to an embodiment, the NES module 476 may collect metadata of content for each category of content. The collected metadata of content may be stored in a content category meta database 4761. In FIG. 4A, it is described that the content category meta database 4761 is imported to the intelligence server 470. However, the disclosure is not limited thereto. As another example, the content category meta database 4761 may be implemented outside the intelligence server 470. In this case, the content category meta database 4761 may be connected to the intelligence server 470 by wire or wirelessly. The NES module 476 may search for content most similar to the keyword extracted from a user utterance (or text data corresponding to the user utterance) based on the metadata of content. According to an embodiment, the metadata of content may mean attribute information of content. For example, the metadata of content included in a music category may include at least one of the title, genre, singer name, album name, file format (e.g., mp3, aac+, or wma), and/or popularity of a song. The metadata of content included in a video category (e.g., movie, or TV program) may include at least one of the title, genre, actors, director, file format (e.g., mp4, avi, or wmv), and/or popularity of video. The metadata of content included in a radio category may include at least one of a channel name, a program name, and a frequency. According to an embodiment, the NES module 476 may return, to the media resolver 473, category information of content having at least one metadata matching a keyword from among a plurality of collected metadata.

According to an embodiment, when there are a plurality of content including at least one metadata matching a keyword, the NES module 476 may return, to the media resolver 473, a score value corresponding to the category of respective content together with the category information. For example, when the plurality of content matching the keyword include content of a first category (e.g., music) and content of a second category (e.g., video), the NES module 476 may return, to the media resolver 473, category information of content including the first category (e.g., music) and the second category (e.g., video), a score value of the first category (e.g., music) for a keyword, and a score value of the second category (e.g., video) for a keyword.

According to an embodiment, the score value for each category returned from the NES module 476 may be determined based on the preference of a plurality of users for a plurality of categories respectively corresponding to a plurality of content matching the keyword. According to an embodiment, the score value for each category returned from the NES module 476 may include a score value to which the latest trend is reflected. For example, when a time point according to time information associated with the first content is later than a time point according to time information associated with the second content, from among the first content of the first category and the second content of the second category, the score value of the first category may be higher than the score value of the second category. For example, when keyword A is both a song title and a drama title, and a point in time when the drama is aired later than a point in time when the song was released, the drama among the song and the drama has recently aired, and thus a score value of a video category corresponding to a category of the drama may be higher than a score value of a music category corresponding to a category of the song.

According to an embodiment, when there is a single category returned by the NES module 476, the media resolver 473 may determine that the corresponding category is a category of content requested by the user. When there are a plurality of categories returned by the NES module 476, the media resolver 473 may determine priorities between the plurality of categories.

According to an embodiment, the media resolver 473 may determine the priority between the plurality of categories, based on context information. According to an embodiment, the context information may include information about an application being executed by the electronic device 460. For example, the application being executed by the electronic device 460 may include a focused app (or a foreground app) and/or a background app. The focused app (or foreground app) may mean an application of which the execution screen is displayed on a display (e.g., the display 293 of FIG. 1B) of the electronic device 460. The background app may mean an application of which the execution screen is not displayed on the display. According to an embodiment, the context information may include focused app information, background app information, and/or state information (e.g., an operating state) of the background app. According to an embodiment, the electronic device 460 may transmit, to the intelligence server 470, context information together with the user's voice input.

According to an embodiment, when the context information received from the electronic device 460 is present, the media resolver 473 may assign a higher priority to a category supported by an app (e.g., a focused app or a background app) running on the electronic device 460 than a category supported by an app not running on the electronic device 460. For example, when the plurality of content matching a keyword include content of a first category and content of a second category, the first category is a category supported by the focused app or background app, and the second category is a category not supported by the focused app or background app, the media resolver 473 may determine the priority between the first category and the second category such that the priority of the first category is higher than the priority of the second category.

According to various embodiments, the media resolver 473 may assign a higher priority to a category supported by the focused app than a category supported by the background app. For example, when the first category is a category supported by the focused app and the second category is a category supported by the background app, the media resolver 473 may determine the priority between the first category and the second category such that the priority of the first category is higher than the priority of the second category. As another example, when an intelligent app (or a speech recognition app) is a focused app, the media resolver 473 may assign a higher priority to a category supported by a more recently executed app or a more frequently used app from among background apps.

According to an embodiment, the media resolver 473 may access IoT device information stored in an IoT cloud server (not shown) (e.g., the server 108 in FIG. 1A) through the IoT cloud management module 475, or may receive the IoT device information from the IoT cloud server (not shown).

According to an embodiment, an IoT device may mean at least one IoT device that is registered in the IoT cloud server (not shown) with the same account as a user account of the electronic device 460. For example, the IoT device may store device information about the IoT device in the IoT cloud server.

According to an embodiment, the IoT device information may include a list of IoT devices and/or state information of IoT devices. For example, the IoT device information may include at least one of a device name, a device type, an identifier (identification information) (e.g., media access control (MAC) address) of a device, location information (e.g., information about a room where an IoT device is located), capability information, and/or state information.

According to an embodiment, the media resolver 473 may search for an IoT device capable of playing content matching a keyword based on the capability information and/or state information of the IoT device. According to an embodiment, the capability information of an IoT device may include category information of content supported by the IoT device. According to an embodiment, the state information of an IoT device may include information indicating whether the IoT device is turned on or off, such that the IoT device is capable of playing content.

For example, when the plurality of content matching a keyword include content of a first category supported by a first IoT device and content of a second category supported by a second IoT device, the first IoT device is turned on, and the second IoT device is turned off, the media resolver 473 may determine the priority between the first category and the second category such that the priority of the first category is higher than the priority of the second category.

According to an embodiment, the media resolver 473 may access user historical data stored in a user historical database 4741 through the user historical data management module 474. According to an embodiment, the user historical data may include content selected by a user of the electronic device 460 based on a voice input, or category information selected from the corresponding content. For example, the user historical data may include at least one of a search keyword, a finally-selected category, and a timestamp. For example, keyword A associated with the content included in the user's voice input (or a user utterance), a category of content finally selected from among at least one content matching keyword A, and time point information at a content search time point may be linked to one another and then may be stored in the user historical database 4741.

According to an embodiment, the user historical database 4741 may be stored in a memory (e.g., the memory 296 in FIG. 1B).

According to an embodiment, the media resolver 473 may calculate a score value for each category based on user historical data. According to an embodiment, the media resolver 473 may calculate the number of times that each of a plurality of categories is selected, as compared to the total number of times that one of a plurality of categories is selected. For example, a score value Score(A) of category A may be calculated by Equation 1 below.

$$\text{Score}(A) = \frac{\text{Number of selections of category } A}{\text{Number of selections of all categories}} \quad \text{Equation 1}$$

For example, when a plurality of categories of content include category A, category B, category C, and category D, the Score(A) that is a score value of category A may be calculated as "the number of selections of category A/(the number of selections of category A+the number of selections of category B+the number of selections of category C+the number of selections of category D)".

According to an embodiment, the media resolver 473 may specify a section and then may calculate a score value for each category. According to an embodiment, the media resolver 473 may specify a predetermined time or a predetermined period from a point in time when the score value for each category is calculated, and then may calculate a score value for each category. For example, the media resolver 473 may calculate AllTimeScore(A), which is a score value of category A during the entire time, RecentScore(A), which is a score value of category A for recent one hour, or LastNScore(A) obtained by computing a score of A category up to the last N times (e.g., first, second, or third).

According to an embodiment, the media resolver 473 may calculate the number of times that each of a plurality of categories is selected with respect to the specified keyword, as compared to the total number of times that one of a plurality of categories is selected with respect to the specified keyword. For example, a score value KeywordScore(A, K) of category A for keyword K may be calculated by Equation 2 below.

$$\text{KeywordScore}(A, K) = \frac{\text{Number of selections of category } A \text{ for keyword } K}{\text{Number of selections of all categories for keyword } K} \quad \text{Equation 2}$$

For example, when all categories of content consist of category A, category B, category C, and category D, KeywordScore(A, K) may be calculated as "the number of selections of category A for keyword K/(the number of selections of category A for keyword K+the number of selections of category B for keyword K+the number of selections of category C for keyword K+the number of selections of category D for keyword K)"

According to an embodiment, the media resolver 473 may calculate a weighted sum score value that is obtained by applying a weight for each score to a first score value, which is a score value for each category returned from the NES module 476, and a second score value, which is a score value for each category calculated based on user historical data and by summing the applied results.

According to an embodiment, the first score value (e.g., NESScore(A, K)) may be determined based on the preference of a plurality of users for a plurality of categories respectively corresponding to the piece of content matching a keyword. For example, the preference for recent content from among a plurality of content for the same keyword may be high. The score value of a category including the recent content may be determined to be relatively high.

According to an embodiment, a score value for each category determined based on user historical data may include a score value (e.g., AllTimeScore(A), RecentScore(A), or LastNScore(A)), which is obtained by calculating the number of times that a user selects each of a plurality of categories, as compared to the total number of times that the user selects one of a plurality of categories within a specified section. According to an embodiment, a score value for each category determined based on user historical data may include a score value (e.g., KeywordScore(A, K)), which is obtained by calculating the number of times that a user selects each of a plurality of categories with respect to a specified keyword, as compared to the total number of times that the user selects one of a plurality of categories with respect to a specified keyword.

According to an embodiment, a second score value may include AllTimeScore(A), RecentScore(A), LastNScore(A), and/or KeywordScore(A, K). According to an embodiment, the weight for each score applied to the first score value and the second score value may include a weight w1 for the first score value (e.g., NESScore(A, K)), a weight w2 for the AllTimeScore(A), a weight w3 for the RecentScore(A), a weight w4 for the LastNScore(A), and/or a weight w5 for the KeywordScore(A, K). According to an embodiment, the media resolver 473 may calculate the weighted sum score value by multiplying each score value by a weight (w1, w2, w3, w4, and/or w5) for each score and summing the multiplied results. According to the above-described embodiment, the weighted sum score value TotalScore(A, K) of category A may be calculated by Equation 3 below.

$$TotalScore(A, K) = (w1 \times NesScore(A, K)) + \\ (w2 \times AllTimeScore(A)) + (w3 \times RecentScore(A)) + \\ (w4 \times LastNScore(A)) + (w5 \times KeywordScore(A, K)))$$

Equation 3

According to an embodiment, a user tends to search for content that the user has recently found, and thus the reliability of a score value for each category may be improved by setting a weight of data, which is close to the most recent time point, from among user historical data to be high. According to the above, a section of the second score value may include a specific time or a specific period from a recent time point (e.g., a point in time when the media resolver 473 calculates a score value), and thus a weight for each score applied to the second score value may increase as the length of the section decreases. For example, AllTime-Score(A) may be a score value of category A during the entire time, and RecentScore(A) may be a score value of category A for recent one hour. Accordingly, a section length of RecentScore(A) may be shorter than a section length of AllTimeScore(A). Accordingly, w3 that is a weight for RecentScore(A) may be a higher value (a greater value) than w2 that is a weight for AllTimeScore(A).

According to an embodiment, in terms of determining the intent of the user of the electronic device 460, data associated with only the user of the electronic device 460 may have higher reliability than data associated with a plurality of users. Accordingly, according to an embodiment, the weight for each score applied to the second score value may be higher than the weight for each score applied to the first score value. For example, the weights w2, w3, w4, or w5 that is a weight for the second score value (e.g., AllTime-Score(A), RecentScore(A), LastNScore(A), or Keyword-Score(A, K)) may be higher than w1 that is the weight for the first score value (e.g., NESScore(A, K)).

In the above-described embodiments, it is described that the score value of category A is calculated. However, score values of other categories of category B, category C, or category D may be calculated in the same manner. According to an embodiment, the media resolver 473 may determine the priority between a plurality of categories based on the score value (e.g., the weighted sum score value) for each category calculated by the above-described method. For example, the media resolver 473 may determine the priority between a plurality of categories so as to have a high priority as the score value increases. According to an embodiment, the media resolver 473 may determine that a category having the highest score value is a category of content requested by the user.

According to an embodiment, the media resolver 473 may return, to the NLU module 472, a category determined as the category of content requested by the user. The NLU module 472 may determine the user's intent based on the category determined by the media resolver 473. According to an embodiment, the NLU module 472 may deliver, to the application manager 477, a request for playing content corresponding to the determined category.

According to an embodiment, the application manager 477 may control at least one application (e.g., a first application 477-1, a second application 477-2, . . . , a n-th application 477-n) so as to perform a task requested by the user. According to an embodiment, when receiving a request for playing content that matches the keyword included in the user utterance and is included in the specified category, the application manager 477 may play content by using an application, which supports the specified category (e.g., a category determined by the media resolver 473). For example, when it is determined that the user's voice input indicates that the playback of content of category A is requested, the application manager 477 may play content corresponding to category A by using an application that supports category A.

According to an embodiment, the intelligence server 470 may transmit, to the electronic device 460, a response to play content corresponding to the determined content category. The electronic device 460 may play content according to the received response, through an output device. For example, the output device may include at least one of a speaker (e.g., the speaker 294 in FIG. 1B) or a display (e.g., the display 293 in FIG. 1B).

According to various embodiments, the intelligence server 470 may play content by using another electronic device (e.g., an IoT device) owned by the user of the electronic device 460 other than the electronic device 460. For example, when the intelligence server 470 determines a category supported by a specified IoT device based on IoT device information, the intelligence server 470 may transmit, to the specified IoT device, a response to play the content corresponding to the category. When receiving the response, the specified IoT device may play content corresponding to the category, which is determined by the intelligence server 470, through the output device of the specified IoT device.

Hereinafter, a configuration and operation of an electronic device according to an embodiment will be described with reference to FIG. 4B.

Figure 4B:
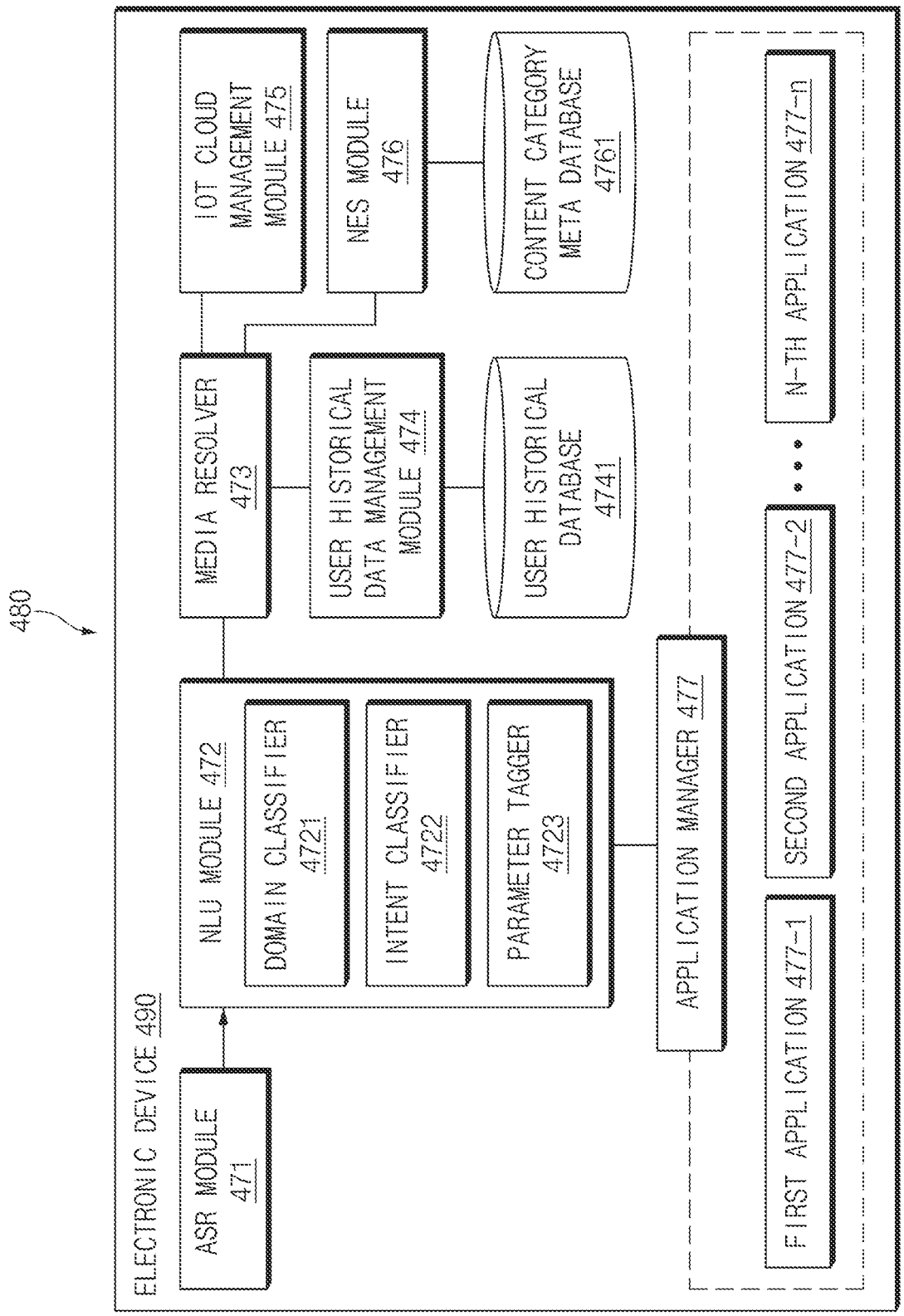
FIG. 4B is a block diagram illustrating an integrated intelligence system, according to an embodiment of the disclosure.

FIG. 4B is a block diagram illustrating an integrated intelligence system, according to an embodiment of the disclosure.

Referring to FIG. 4B depicting a block diagram 480, according to an embodiment, an integrated intelligence system may include an electronic device 490. The electronic device 490 illustrated in FIG. 4B may include components of the intelligence server 470 illustrated in FIG. 4A. According to an embodiment, in the integrated intelligence system illustrated in FIG. 4B, one or more components performing the same function as components of the intelligence server 470 of FIG. 4A may be implemented on the electronic device 490.

According to an embodiment, the electronic device 490 may include an ASR module 471 (e.g., the ASR module 221 of FIG. 1B), the NLU module 472 (e.g., the NLU module 223 of FIG. 1B), the media resolver 473, the user historical data management module 474, the Internet of things (IoT) cloud management module 475, the named entity service (NES) module 476, and/or the application manager 477.

According to an embodiment, each module (e.g., the ASR module 471, the NLU module 472, the media resolver 473, the user historical data management module 474, the IoT cloud management module 475, the NES module 476, or the application manager 477) included in the electronic device 490 may be implemented in software or hardware. In an embodiment, the modules may be a program, which is stored in a memory (e.g., the memory 296 in FIG. 1B) of the electronic device 490 and which is coded to perform a specified operation. The modules may include a plurality of instructions. For example, the modules may be loaded onto a processor (e.g., the processor 292 in FIG. 1B) of the electronic device 490 and then may be executed. The processor of the electronic device 490 may be configured to execute instructions of the modules.

According to an embodiment, operations performed by each module of the electronic device 490 are described above with reference to FIG. 4A, and thus redundant descriptions will be omitted or simplified.

According to an embodiment, the electronic device 490 may receive the user's voice input through a microphone (e.g., the microphone 295 of FIG. 1B). According to an embodiment, the ASR module 471 may convert the received voice input of the user into text data. According to an embodiment, the NLU module 472 may grasp the user's intent by using the text data of the voice input.

According to an embodiment, the media resolver 473 may extract a keyword associated with content from the text data and then may determine a category of content depending on the extracted keyword. According to an embodiment, the media resolver 473 may return, to the NLU module 472, a category determined as the category of content requested by the user. The NLU module 472 may determine the user's intent based on the category determined by the media resolver 473. According to an embodiment, the NLU module 472 may deliver, to the application manager 477, a request for playing content corresponding to the determined category.

According to an embodiment, the application manager 477 may control at least one application (e.g., the first application 477-1, the second application 477-2, . . . , the n-th application 477-n) so as to perform a task requested by the user. According to an embodiment, when receiving a request for playing content that matches the keyword included in the user utterance and is included in the specified category, the application manager 477 may play content by using an application, which supports the specified category (e.g., a category determined by the media resolver 473). For example, when it is determined that the user's voice input indicates that the playback of content of category A is requested, the application manager 477 may play content corresponding to category A by using an application that supports category A.

According to an embodiment, the electronic device 490 may play content corresponding to the determined content category through an output device (e.g., a speaker or a display). According to various embodiments, the electronic device 490 may play content by using another electronic device (e.g., an IoT device) owned by the user of the electronic device 460 in a network environment.

Hereinafter, an operation of the integrated intelligence system (e.g., the integrated intelligence system of FIG. 4A or the integrated intelligence system of FIG. 4B) according to an embodiment will be described with reference to FIG. 5.

Figure 5:
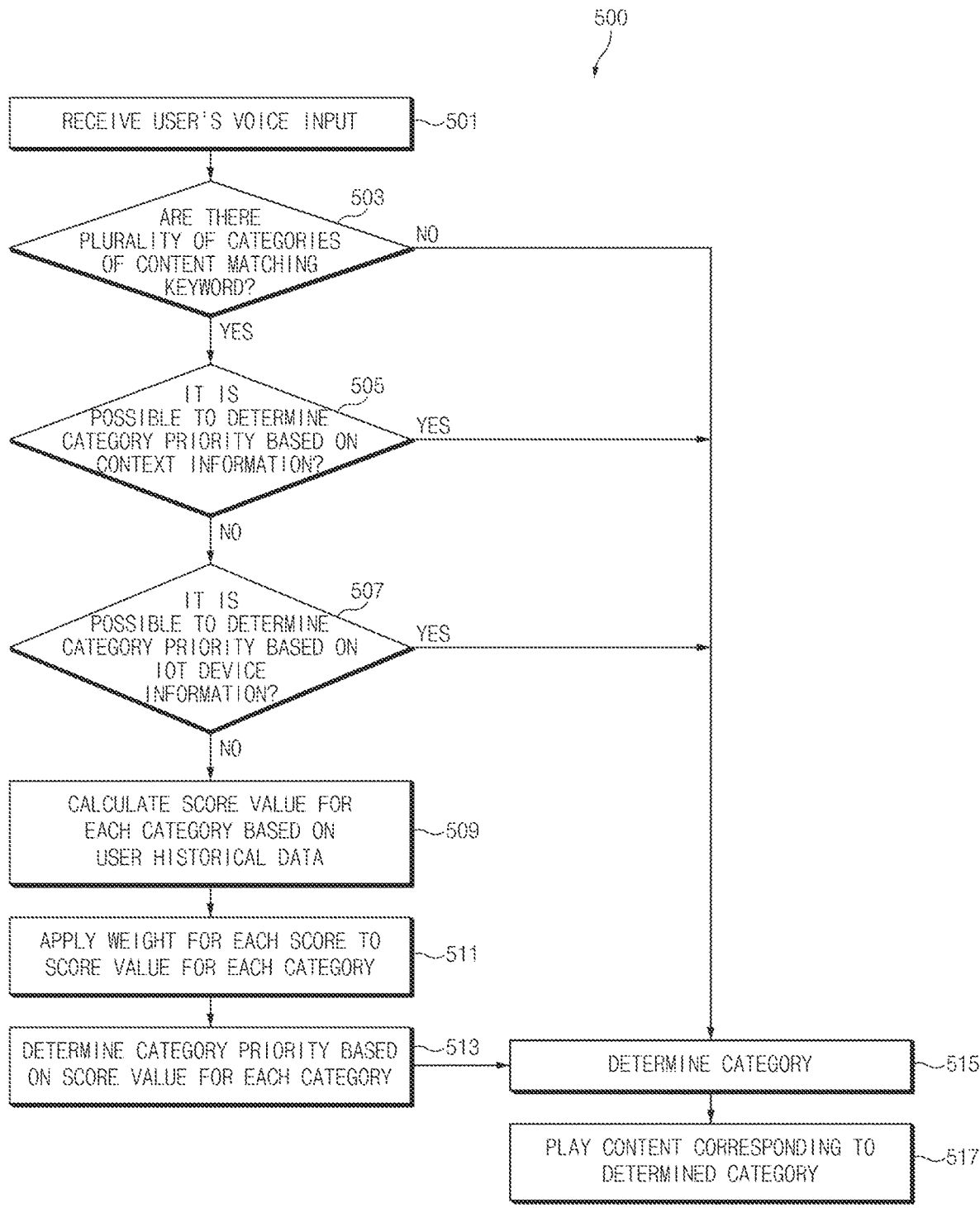
FIG. 5 is a flowchart illustrating a method of operating an integrated intelligence system, according to an embodiment of the disclosure.

FIG. 5 is a flowchart illustrating a method of operating an integrated intelligence system, according to an embodiment of the disclosure.

Referring to FIG. 5 depicting a flowchart 500, hereinafter, it is assumed that an integrated intelligence system performing operations is the integrated intelligence system of FIG. 4A. Operations performed by an electronic device (e.g., the electronic device 460 of FIG. 4A) or an intelligence server (e.g., the intelligence server 470 of FIG. 4A) described below may be performed by each processor (e.g., the processor 292 of FIG. 1B).

At operation 501, the electronic device 460 may receive a user's voice input. For example, the electronic device 460 may receive the user's voice input through a microphone (e.g., the microphone 295 of FIG. 1B). The electronic device 460 may transmit the received voice input to the intelligence server 470. According to an embodiment, the intelligence server 470 may convert a voice input into text data and may extract a keyword from the text data.

At operation 503, the intelligence server 470 may determine whether there are a plurality of categories of content matching a keyword. According to an embodiment, the intelligence server 470 may identify categories of one or more content matching the keyword. The intelligence server 470 may identify the category of content matching the keyword based on category information of the content having at least one metadata, which matches the keyword, from among a plurality of metadata of the content collected through an NES module (e.g., the NES module 476 of FIG. 4A). According to an embodiment, when there is a single category of the identified content (operation 503—No), the intelligence server 470 may perform operation 515. When there are a plurality of categories of the identified content (operation 503—Yes), the intelligence server 470 may perform operation 505.

At operation 505, the intelligence server 470 may determine whether it is possible to determine the category priority based on context information. The context information may include information about an application being executed by the electronic device 460. For example, the context information may include a focused app, a background app, and/or an operating state of a background app. According to an embodiment, when there is an application being executed by the electronic device 460, the intelligence server 470 may receive context information from the electronic device 460. When an application being executed by the electronic device 460 is not present, the intelligence server 470 may determine that it is impossible to determine the category priority based on context information (operation 505—No).

According to an embodiment, the intelligence server 470 may determine the category priority based on the context information received from the electronic device 460 (operation 505—Yes). For example, when there is a category, which is supported by a focused app or a background app, from among categories of a plurality of content matching the keyword, the intelligence server 470 may determine the priority between the categories of the plurality of content such that the priority of a category supported by the focused app or the background app is higher than the priorities of the remaining categories.

As another example, the intelligence server 470 may determine the priority between the categories of a plurality of content such that the priority of the category supported by the focused app is higher than the priority of the category supported by the background app.

According to an embodiment, although the intelligence server 470 receives context information from the electronic device 460, the intelligence server 470 may fail to determine the category priority based on the context information (operation 505—No). For example, when the electronic device 460 is displaying execution screens of at least two applications in a multi-window (i.e., when there are at least two or more focused apps, and categories of at least two focused apps are different from one another), the intelligence server 470 may fail to determine the priority between the at least two focused apps.

According to an embodiment, when the intelligence server 470 determines the category priority based on context information (operation 505—Yes), the intelligence server 470 may perform operation 515. When the intelligence server 470 does not determine the category priority based on the context information (operation 505—No), the intelligence server 470 may perform operation 507.

At operation 507, the intelligence server 470 may determine whether to determine the category priority based on IoT device information. According to an embodiment, the IoT device information may include a list of IoT devices, which are owned by the user of the electronic device 460, and/or state information of the IoT devices. For example, the IoT device information may include at least one of a device name, a device type, an identifier (identification information) (e.g., MAC address) of a device, location information (e.g., information about a room where an IoT device is located), capability information, and/or state information. According to an embodiment, when the electronic device 460 is connected to at least one IoT device, the intelligence server 470 may receive the IoT device information from an IoT cloud through an IoT cloud management module (e.g., the IoT cloud management module 475 of FIG. 4A). According to an embodiment, when the electronic device 460 is not connected to at least one IoT device, the intelligence server 470 may determine that it is impossible to determine the category priority based on the IoT device information (operation 507—No).

According to an embodiment, the intelligence server 470 may determine the category priority based on the IoT device information received from an IoT cloud (operation 507—Yes). According to an embodiment, the intelligence server 470 may search for an IoT device capable of playing content matching a keyword based on the capability information and/or state information of an IoT device. According to an embodiment, the capability information of an IoT device may include category information of content supported by the IoT device. According to an embodiment, the state information of an IoT device may include information indicating whether the IoT device is turned on or off, such that the IoT device is capable of playing content. For example, the intelligence server may search for an IoT device, which is in a turn-on state and supports at least one of categories of a plurality of content matching a keyword, from a list of IoT devices.

For example, when there is a category, which is supported by an IoT device that is in a turn-on state, from among categories of a plurality of content matching the keyword, the intelligence server 470 may determine the priority between the categories of the plurality of content such that the priority of the category supported by the IoT device in the turn-on state is higher than the priority of the category supported by the IoT device in the turn-off state.

According to an embodiment, when the intelligence server 470 determines the category priority based on IoT device information (Operation 507—Yes), the intelligence server 470 may perform operation 515. When the intelligence server 470 fails to determine the category priority based on IoT device information (Operation 507—No), the intelligence server 470 may perform operation 515 after performing operation 509 to operation 513.

At operation 509, the intelligence server 470 may calculate a score value for each category based on user historical data. According to an embodiment, the user historical data may include information about content selected by a user of the electronic device 460 based on voice input or information about the category of the corresponding content. For example, the user historical data may include at least one of a search keyword, a finally-selected category, and a timestamp. When receiving a voice input for searching for or selecting content from a user, the intelligence server 470 may store the user historical data in a user historical database (e.g., the user historical database 4741 in FIG. 4A). The intelligence server 470 may access the user historical database through a user historical data management module (e.g., the user historical data management module 474 in FIG. 4A). It is described, with reference to FIG. 4A, how the intelligence server 470 calculates a score value for each category, and thus redundant descriptions will be omitted or simplified.

According to an embodiment, the intelligence server 470 may calculate the number of times that each of a plurality of categories is selected, as compared to the total number of times that one of a plurality of categories is selected. According to an embodiment, the intelligence server 470 may specify a section and then may calculate a score value for each category. For example, the intelligence server 470 may calculate AllTimeScore(A), which is a score value of category A during the entire time, RecentScore(A), which is a score value of category A for recent one hour, or LastNScore(A) obtained by computing a score of A category up to the last N times (e.g., first, second, or third).

According to an embodiment, the intelligence server 470 may calculate the number of times that each of a plurality of categories is selected with respect to the specified keyword, as compared to the total number of times that one of a plurality of categories is selected with respect to the specified keyword. For example, the intelligence server 470 may calculate KeywordScore(A, K) obtained by calculating the score value of category A for keyword K.

At operation 511, the intelligence server 470 may apply a weight for each score to a score value for each category. As described above, the intelligence server 470 may calculate a score value for each of various categories based on the user historical data of the user of the electronic device 460. According to an embodiment, the intelligence server 470 may differently apply a weight to each score value depending on the length of a section of a score for each category. According to an embodiment, the intelligence server 470 may determine a weight applied to the corresponding score value to be high, as the length of the section of the score is short. For example, because a section length of RecentScore (A) that is a score value of category A for recent one hour is shorter than a section length of AllTimeScore(A) that is a score value of category A during the entire time, the intelligence server 470 may determine a weight applied to RecentScore(A) as a value higher than the weight applied to AllTimeScore(A).

According to an embodiment, the intelligence server 470 may identify a score value for each category determined based on the preference of a plurality of users, through an NES module (e.g., the NES module 476 of FIG. 4A). According to an embodiment, when identifying a category of content matching a keyword through the NES module, the intelligence server 470 may identify a score value for each category together. A score value for each identified category may be referred to as a "first score value". For example, the score value of category A returned by the NES module for keyword K may be NESScore(A, K). According to an embodiment, the first score value returned by the NES module may include a score value to which the latest trend is reflected. According to an embodiment, as a time point according to time information associated with content included in each of a plurality of categories matching a keyword is late, the first score value may be increased. For example, the category including the latest content may have the highest score value.

According to an embodiment, the score value for each category determined based on the user historical data of the user of the electronic device 460 may be referred to as a "second score value". The second score value may be distinguished from the first score value in that the second score value is determined based on only the preference of the user of the electronic device 460. According to an embodiment, the intelligence server 470 may determine that a weight applied to the second score value is higher than a weight applied to the first score value.

According to an embodiment, the intelligence server 470 may calculate a weighted sum score value obtained by applying a weight for each score to the score value for each category and by summing the applied results. According to an embodiment, the intelligence server 470 may obtain the weighted sum score value by multiplying the score value for each category by the weight for each score and by summing the multiplied results. For example, assuming that a weight applied to NESScore(A, K) is w1, a weight applied to AllTimeScore(A) is w2, a weight applied to RecentScore(A) is w3, a weight applied to LastNScore(A) is w4, and a weight applied to KeywordScore(A, K) is w5, the intelligence server 470 may obtain the weighted sum score value (e.g., TotalScore(A, K)) by Equation 3 (Equation 3: TotalScore(A, K)=(w1×NESScore(A,K))+(w2×AllTimeScore(A))+(w3×RecentScore(A))+(w4×LastNScore(A))+(w5×KeywordScore(A, K))).

At operation 513, the intelligence server 470 may determine a category priority based on a score value for each category. According to an embodiment, as the score value is greater, the intelligence server 470 may assign a higher priority to the corresponding category. For example, the intelligence server 470 may determine a priority between a plurality of categories so as to have a higher priority as the weighted sum score value is higher. The intelligence server 470 may determine that a category having the greatest weighted sum score value is a category having the highest priority.

According to an embodiment, when "No" is determined at operation 503, when "Yes" is determined at operation 505, when "Yes" is determined at operation 507, or after operation 513 is performed, the intelligence server 470 may perform operation 515.

At operation 515, the intelligence server 470 may determine a category based on the category priority information determined by performing operation 503, operation 505, operation 507, or operation 509 to operation 513. According to an embodiment, the intelligence server 470 may determine that the category having the highest priority is a category of content requested by the user based on voice.

At operation 517, the electronic device 460 may play content corresponding to the determined category. The intelligence server 470 may determine application information and/or deeplink information, which supports a category based on the determined category information and user's intent. It is described that a method of grasping the user's intent from the received voice input of the user by the intelligence server 470, and thus a detailed description will be omitted to avoid redundancy. The intelligence server 470 may transmit, to the electronic device 460, the determined application information and/or the deeplink information. For example, the electronic device 460 may play content matching a keyword by using an application capable of playing content of a category determined by the intelligence server 470. The electronic device 460 may play content through an output device including a speaker (e.g., the speaker 294 of FIG. 1B) or a display (e.g., the display 293 of FIG. 1B). For example, the application may include an application stored in an electronic device, a virtual application, or a web application.

According to various embodiments, the electronic device playing content may include an IoT device owned by the user of the electronic device 460 in addition to the electronic device 460 receiving the user's voice input. For example, when the category of content requested by the user is determined based on IoT device information, the electronic device 460 or the intelligence server 470 may control the IoT device such that the IoT device having the highest priority plays content.

Hereinafter, a method of determining a category of content to be played and playing the content by the electronic device according to an embodiment when the number of categories returned from an NES module is one will be described with reference to FIG. 6.

Figure 6:
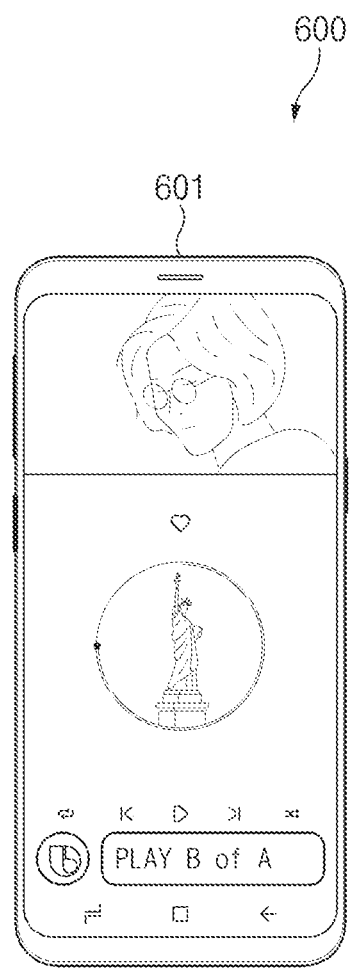
FIG. 6 is a diagram illustrating an electronic device that plays content based on a voice input, according to an embodiment of the disclosure.

FIG. 6 is a diagram illustrating an electronic device that plays content based on a voice input, according to an embodiment of the disclosure. Operations of an electronic device 601 (e.g., the electronic device 460 of FIG. 4A) described below may be performed by a processor (e.g., the processor 292 of FIG. 1B) of the electronic device 601.

Referring to FIG. 6 depicting a diagram 600, according to an embodiment, the electronic device 601 may receive, from a user, a voice input saying that "play B of A". The electronic device 601 may transmit the received voice input to an intelligence server (e.g., the intelligence server 470 of FIG. 4A). The intelligence server may change the voice data received from the electronic device 601 into text data. According to an embodiment, the intelligence server may transmit the text data to the electronic device 601. The electronic device 601 may display the text data on a display. The intelligence server may extract keywords 'A' and 'B' from the text data. The intelligence server may search for content matching keywords 'A' and 'B' based on the metadata for each category of content through an NES module (e.g., the NES module 476 of FIG. 4A), and may identify one or more categories of content matching the keywords. For example, when 'A' is a singer's name and 'B' is a song title, the NES module may return "music" category for keywords 'A' and 'B'.

According to an embodiment, when the number of categories of content matching at least one keyword included in the user input is one, the intelligence server may determine that one category returned from the NES module is a category of content requested by the user. The intelligence server may determine application information and/or deeplink information, which supports a category based on the determined category information ("music" category) and a user's intent. The intelligence server may transmit, to the electronic device 601, application information and/or deeplink information, which supports "music" category. For example, the electronic device 601 may play music content matching keywords 'A' and 'B', by using an application capable of playing content in "music" category. Referring to FIG. 6, the electronic device 601 may output a sound through a speaker and may output a user interface associated with music playback through a display.

Hereinafter, a method of determining a category of content based on context information and playing the content by the electronic device according to an embodiment when the number of categories returned from an NES module is multiple will be described with reference to FIGS. 7A and 7B.

Figure 7A:
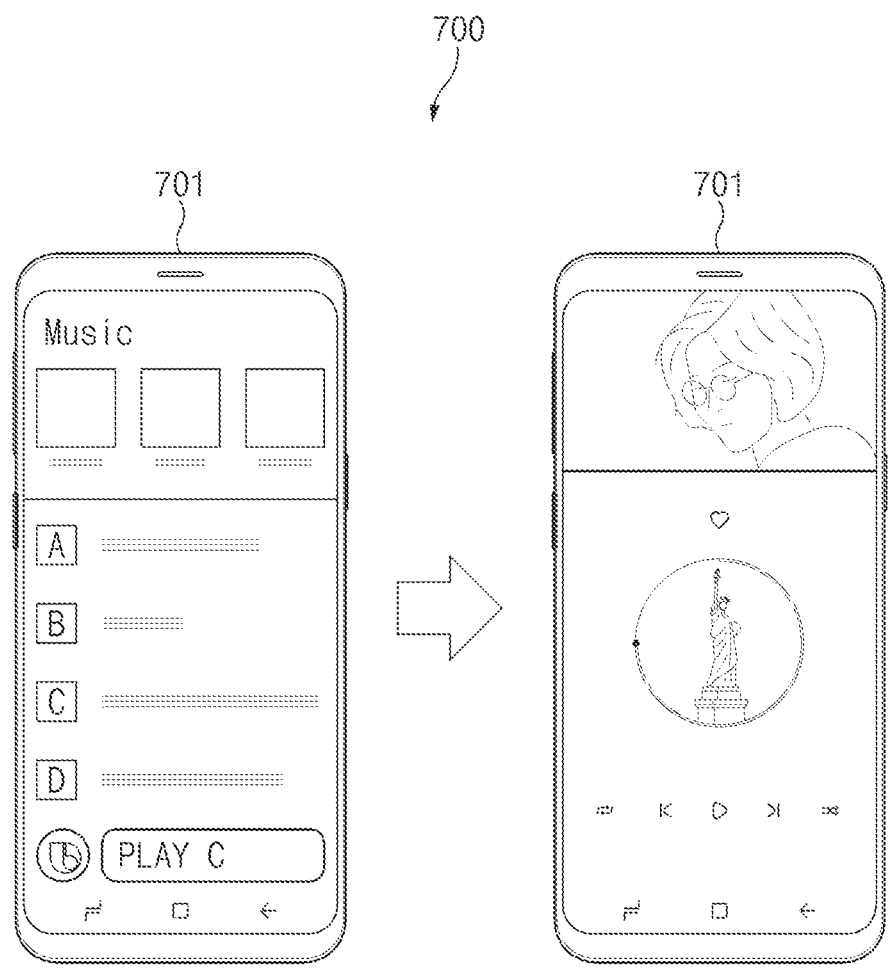
FIGS. 7A and 7B are diagrams illustrating an electronic device that plays content based on voice input and context information, according to various embodiments of the disclosure.
Figure 7B:
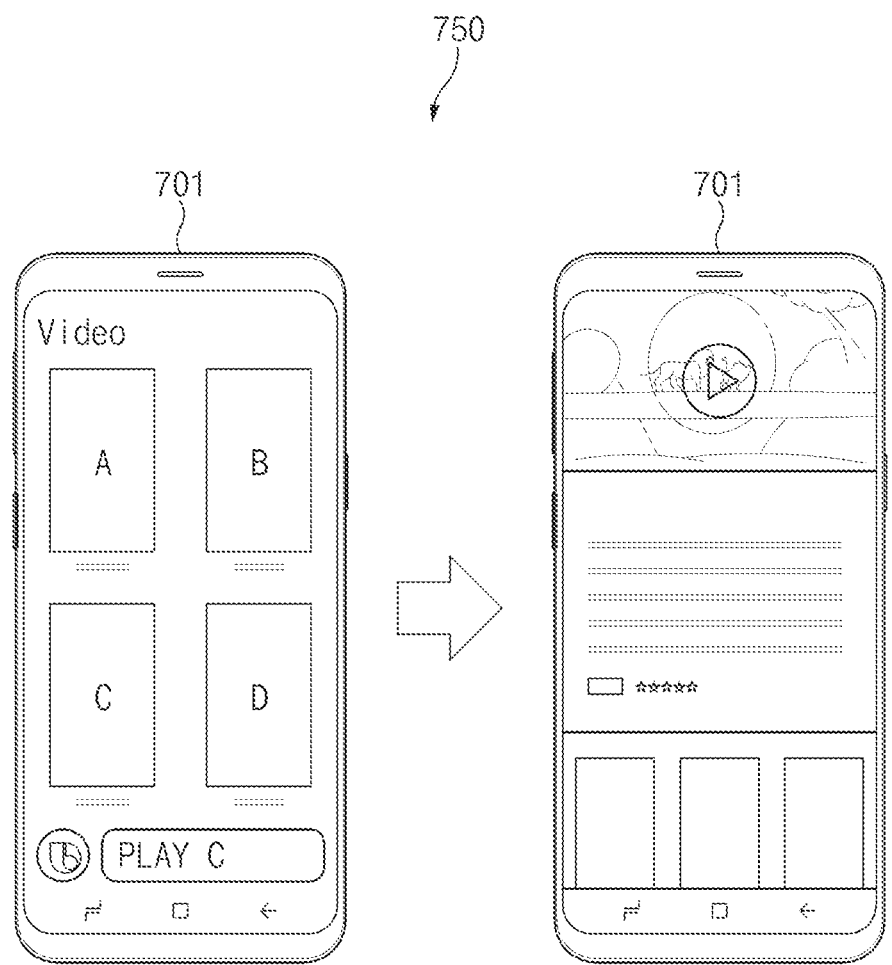

FIGS. 7A and 7B are diagrams illustrating an electronic device that plays content based on voice input and context information, according to various embodiments of the disclosure. Operations of an electronic device 701 (e.g., the electronic device 460 of FIG. 4A) described below may be performed by a processor (e.g., the processor 292 of FIG. 1B) of the electronic device 701.

According to an embodiment, the electronic device 701 may receive a voice input from the user saying that "play C". The electronic device 701 may transmit the received voice input to an intelligence server (e.g., the intelligence server 470 of FIG. 4A). The intelligence server may change the voice data received from the electronic device 701 into text data. According to an embodiment, the intelligence server may transmit the text data to the electronic device 701. The electronic device 701 may display the text data on a display. The intelligence server may extract a keyword 'C' from the text data. The intelligence server may search for content matching the keyword 'C' based on the metadata for each category of content through an NES module (e.g., the NES module 476 of FIG. 4A), and may identify one or more categories of content matching the keywords. For example, when 'C' is a song title or a TV program, an NES module may return "music" category and "video" category for keyword 'C'.

Referring to FIG. 7A depicting a diagram 700, when receiving a voice input (e.g., "Play C"), an electronic device 701 may be executing a music streaming application. According to an embodiment, the electronic device 701 may be an electronic device that has most recently executed a music streaming application from among applications, which are capable of playing content, before receiving the voice input. For example, the electronic device 701 may receive the voice input while executing a music streaming application as a foreground app. When transmitting the received voice input to the intelligence server, the electronic device 701 may further transmit information about an application (e.g., a music streaming application) running on the electronic device 701. The intelligence server may determine that "music" category among categories (e.g., "music" category and "video" category) of a plurality of content matching the keyword 'C' is a category of content requested by the user, based on context information indicating that the electronic device 701 is executing a music streaming application. The intelligence server may determine application information and/or deeplink information, which supports a category based on the determined category information ("music" category) and a user's intent. The intelligence server may transmit, to the electronic device 701, application information and/or deeplink information, which supports "music" category. For example, the electronic device 701 may play music content matching the keyword 'C', by using the running music streaming application. For example, the electronic device 701 may output a sound through a speaker and may output a user interface associated with music playback through a display.

Referring to FIG. 7B depicting a diagram 750, when receiving a voice input (e.g., "Play C"), an electronic device 701 may be executing a video streaming application. According to an embodiment, the electronic device 701 may be an electronic device that has most recently executed a video streaming application from among applications, which are capable of playing content, before receiving the voice input. For example, the electronic device 701 may receive the voice input while executing a video streaming application as a foreground app. When transmitting the received voice input to the intelligence server, the electronic device 701 may further transmit information about an application (e.g., a video streaming application) running on the electronic device 701. The intelligence server may determine that "video" category among categories (e.g., "music" category and "video" category) of a plurality of content matching the keyword 'C' is a category of content requested by the user, based on context information indicating that the electronic device 701 is executing a video streaming application. The intelligence server may determine application information and/or deeplink information, which supports a category based on the determined category information ("video" category) and a user's intent. The intelligence server may transmit, to the electronic device 701, application information and/or deeplink information, which supports "video" category. For example, the electronic device 701 may play video content matching the keyword 'C', by using the running video streaming application. For example, the electronic device 701 may output a sound through a speaker and may output a user interface associated with image playback or video playback through a display.

According to various embodiments, "music" category and "video" category have been returned for the keyword 'C' from an NES module. However, when there is no application running on the electronic device 701, the intelligence server may calculate a score value for each category based on user historical data and may determine a category of content requested by the user based on the score value for each category. For example, when the user has a history of selecting "video" category among categories of a plurality of content matching keyword 'C', the intelligence server may determine a score value of "video" category to be higher than a score value of "music" category, and may determine "video" category, which has a relatively high score for each category, as a category of content requested by the user.

In the above example, when the user has not also requested content playback with keyword 'C', the intelligence server may determine a category of content requested by the user based on a ratio for each category of a plurality of user utterances (or a user's voice inputs) for requesting content playback. According to an embodiment, when it is determined that playback of content in "music" category is requested to be more frequently than playback of content in "video" category, because a weight of a recent utterance is high, the intelligence server may determine that "music" category having the high weighted sum score value from among "music" category and "video" category is a category of content requested by the user.

Hereinafter, a method of determining a category of content based on IoT device information and playing the content by the electronic device according to an embodiment when the number of categories returned from an NES module is multiple will be described with reference to FIGS. 8A and 8B.

Figure 8A:
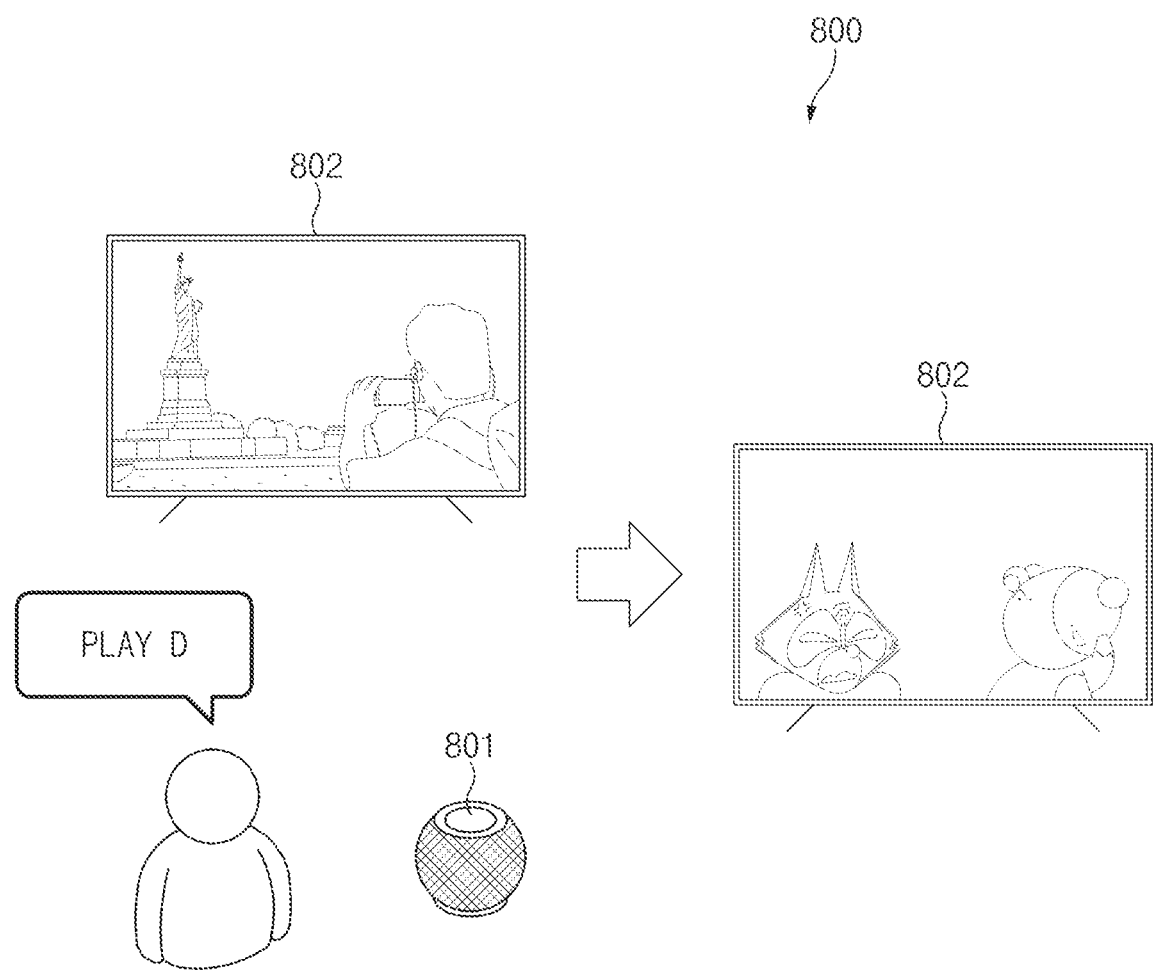
FIGS. 8A and 8B are diagrams illustrating an electronic device that plays content based on voice input and internet-of-things (IoT) device information, according to various embodiments of the disclosure.
Figure 8B:
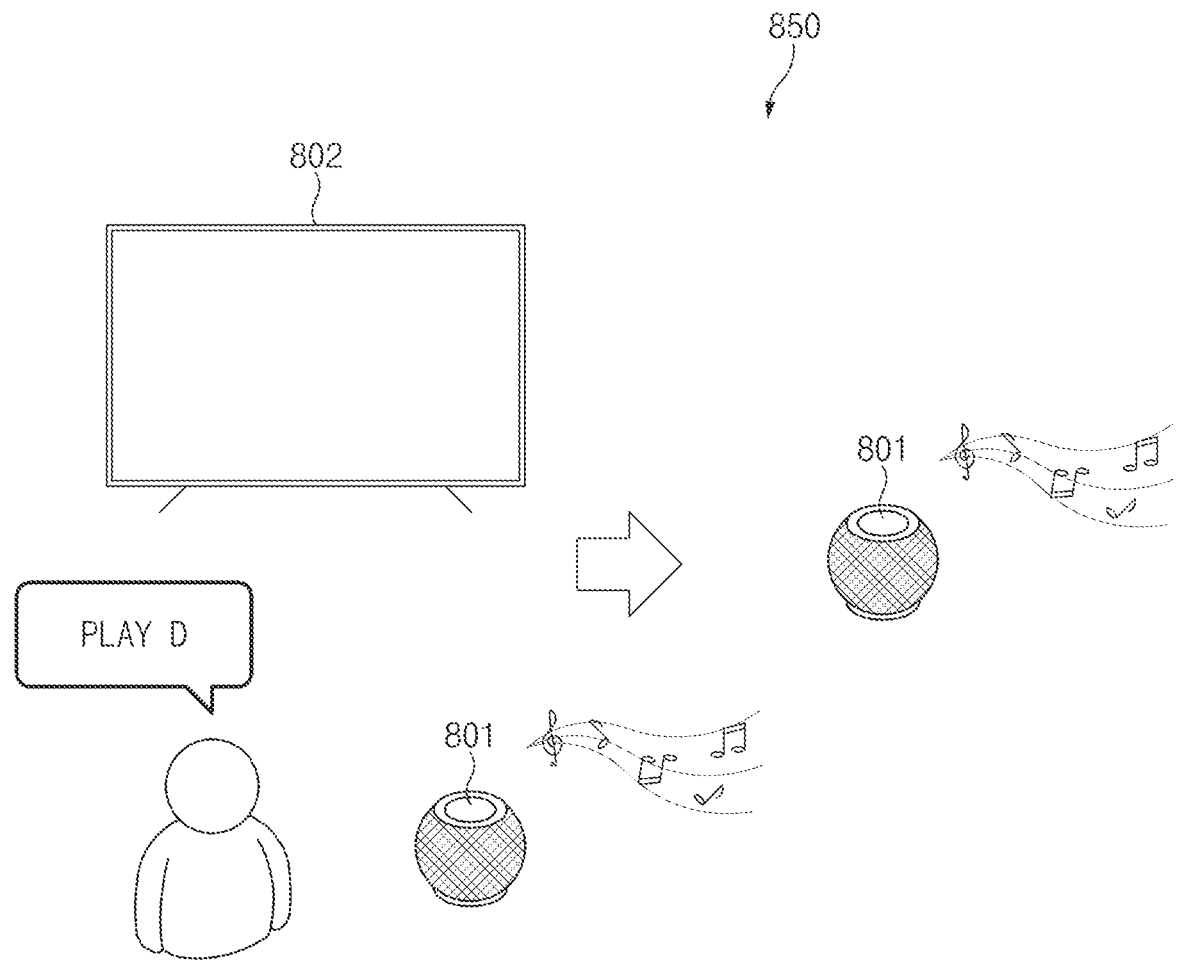

FIGS. 8A and 8B are diagrams illustrating an electronic device that plays content based on voice input and IoT device information, according to various embodiments of the disclosure. Operations of an electronic device 801 described below may be performed by a processor (e.g., the processor 292 of FIG. 1B) of the electronic device 801.

According to an embodiment, the electronic device 801 may receive a voice input from the user saying that "play D". The electronic device 801 may transmit the received voice input to an intelligence server (e.g., the intelligence server 470 of FIG. 4A). The intelligence server may change the voice data received from the electronic device 801 into text data. According to an embodiment, the intelligence server may transmit the text data to the electronic device 801. The electronic device 801 may display the text data on a display. The intelligence server may extract a keyword 'D' from the text data. The intelligence server may search for content matching the keyword 'D' based on the metadata for each category of content through an NES module (e.g., the NES module 476 of FIG. 4A), and may identify one or more categories of content matching the keywords. For example, when 'D' is a song title or a TV program, an NES module may return "music" category and "video" category for keyword 'D'.

According to an embodiment, the intelligence server may receive IoT device information from an IoT cloud through an IoT cloud management module (e.g., the IoT cloud management module 475 of FIG. 4A). For example, the IoT device information may include a list of IoT devices owned by a user of the electronic device 801, capability information including information about a category of content supported by an IoT device, and/or state information including information about a power-on/off state of an IoT device. According to an embodiment, the intelligence server may identify that the user of the electronic device 801 has a TV 802, based on the IoT device information and may identify a category of content (e.g., "video") supported by the TV 802 and a power state (e.g., a turn-on state, or a turn-off state) of the TV 802.

Referring to FIG. 8A depicting diagram 800, when a TV 802 is turned on, an intelligence server may determine that "video" category, which is a category of content supported by the TV 802, from among categories (e.g., "music" category and "video" category) of a plurality of content matching the keyword 'D' is a category of content requested by the user. The intelligence server may determine application information and/or deeplink information, which supports a category based on the determined category information ("video" category) and a user's intent. The intelligence server may transmit, to the electronic device 801, application information and/or deeplink information, which supports "video" category. For example, the electronic device 801 may control the TV 802 so as to play video content matching the keyword 'D' over a network. For example, the electronic device 801 may control the TV 802 so as to output a sound through a speaker of the TV 802 and to output an image or video through a display of the TV 802.

Referring to FIG. 8B depicting diagram 850, when a TV 802 is turned off, an intelligence server may determine that "music" category, which is a category of content supported by an electronic device 801, from among categories (e.g., "music" category and "video" category) of a plurality of content matching the keyword 'D' is a category of content requested by the user. The intelligence server may determine application information and/or deeplink information, which supports a category based on the determined category information ("music" category) and a user's intent. The intelligence server may transmit, to the electronic device 801, application information and/or deeplink information, which supports "music" category. For example, the electronic device 801 may play music content matching the keyword 'D'. For example, the electronic device 801 may output sound through a speaker.

In the embodiment described with reference to FIGS. 6, 7A, 7B, 8A, and 8B, it is illustrated that the electronic device 460 and the intelligence server 470 are separated from each other, like the integrated intelligence system shown in FIG. 4A. However, like the integrated intelligence system shown in FIG. 4B, functions of the intelligence server 470 may be implemented on the electronic device 490.

According to an embodiment disclosed in the specification, an electronic device (e.g., the electronic device 101 of FIG. 1A, the user terminal 201 of FIGS. 1B and 3, the electronic device 460 of FIG. 4A, the electronic device 601 of FIG. 6, the electronic device 701 of FIGS. 7A and 7B, or the electronic device 801 of FIGS. 8A and 8B) may include a microphone (e.g., the input module 150 of FIG. 1A, or the microphone 295 of FIG. 1B), a communication circuit (e.g., the communication module 190 of FIG. 1A, or the communication interface 291 of FIG. 1B), an output device including at least one of a speaker (e.g., the sound output module 155 of FIG. 1A, or the speaker 294 of FIG. 1B) or a display (e.g., the display module 160 of FIG. 1A, or the display 293 of FIG. 1B), a processor (e.g., the processor 120 of FIG. 1A or the processor 292 of FIG. 1B) operatively connected to the microphone, the communication circuit, and the output device, and a memory (e.g., the memory 130 of FIG. 1A or the memory 296 of FIG. 1B) operatively connected to the processor. The memory may store one or more instructions that, when executed, cause the processor to receive a voice input of a user through the microphone, to transmit the voice input and context information to an external server (e.g., the server 108 of FIG. 1A, the intelligence server 200 of FIG. 1B, or the intelligence server 470 of FIG. 4A) through the communication circuit, the context information including information about an application running on the electronic device, to receive a response to play content corresponding to a category determined based on category priority information from among a plurality of content matching a keyword included in the voice input, from the external server through the communication circuit, the category priority information being determined based on the context information, and to play the content through the output device.

According to an embodiment disclosed in the specification, the plurality of content may include content of a first category supported by the running application and content of a second category not supported by the running application. A priority of the first category may be determined by the external server so as to be higher than a priority of the second category.

According to an embodiment disclosed in the specification, the determined category may be determined based on internet of things (IoT) device information by the external server.

According to an embodiment disclosed in the specification, the plurality of content may include content of a first category supported by a first IoT device, which is turned on, and content of a second category supported by a second IoT device, which is turned off A priority of the first category may be determined by the external server so as to be higher than a priority of the second category.

According to an embodiment disclosed in the specification, the determined category may be determined based on a score value for each category by the external server. The score value for each category may include a first score value determined based on preference of a plurality of users for a plurality of categories respectively corresponding to the plurality of content, and a second score value determined based on user historical data of the user for the plurality of categories.

According to an embodiment disclosed in the specification, the determined category may be determined based on a weighted sum score value obtained by applying a weight for each score to the first score value and the second score value and by summing applied results.

According to an embodiment disclosed in the specification, the first score value may increase as a time point according to time information associated with each content included in each of the plurality of categories is late.

According to an embodiment disclosed in the specification, the second score value may include a score value obtained by calculating the number of times that the user selects each of the plurality of categories, as compared to the number of times that the user selects one of the plurality of categories within a specified section.

According to an embodiment disclosed in the specification, a weight for each score applied to the second score value may increase as a length of the section decreases.

According to an embodiment disclosed in the specification, an electronic device (e.g., the electronic device 101 of FIG. 1A, the user terminal 201 of FIGS. 1B and 3, the electronic device 490 of FIG. 4B, the electronic device 601 of FIG. 6, the electronic device 701 of FIGS. 7A and 7B, or the electronic device 801 of FIGS. 8A and 8B) may include a microphone (e.g., the input module 150 of FIG. 1A, or the microphone 295 of FIG. 1B), an output device including at least one of a speaker (e.g., the sound output module 155 of FIG. 1A, or the speaker 294 of FIG. 1B) or a display (e.g., the display module 160 of FIG. 1A, or the display 293 of FIG. 1B), a processor (e.g., the processor 120 of FIG. 1A or the processor 292 of FIG. 1B) operatively connected to the microphone, and the output device, and a memory (e.g., the memory 130 of FIG. 1A or the memory 296 of FIG. 1B) operatively connected to the processor. The memory may store one or more instructions that, when executed, cause the processor to receive a voice input of a user through the microphone, to determine a priority between a plurality of categories respectively corresponding to a plurality of content matching a keyword included in the voice input based on context information, the context information including information about an application running on the electronic device, to determine one category among the plurality of categories based on category priority information, and to play content corresponding to the determined category through the output device.

According to an embodiment disclosed in the specification, the plurality of content may include content of a first category supported by the running application and content of a second category not supported by the running application. The instructions may cause the processor to assign a priority, which is higher than a priority of the second category, to the first category.

According to an embodiment disclosed in the specification, the electronic device may further include a communication circuit operatively connected to the processor. The instructions may cause the processor to receive IoT device information from an IoT cloud through the communication circuit and to determine the priority between the plurality of categories based on the IoT device information.

According to an embodiment disclosed in the specification, the plurality of content may include content of a first category supported by a first IoT device, which is turned on, and content of a second category supported by a second IoT device, which is turned off. The instructions may cause the processor to assign a priority, which is higher than a priority of the second category, to the first category.

According to an embodiment disclosed in the specification, the instructions may cause the processor to determine the one category based on a score value for each category. The score value for each category may include a first score value determined based on preference of a plurality of users for the plurality of categories, and a second score value determined based on user historical data of the user for the plurality of categories.

According to an embodiment disclosed in the specification, the instructions may cause the processor to determine the one category based on the weighted sum score value obtained by applying a weight for each score to the first score value and the second score value and by summing applied results.

According to an embodiment disclosed in the specification, a voice-based content providing method of an electronic device (e.g., the electronic device 101 of FIG. 1A, the user terminal 201 of FIGS. 1B and 3, the electronic device 460 of FIG. 4A, the electronic device 601 of FIG. 6, the electronic device 701 of FIGS. 7A and 7B, or the electronic device 801 of FIGS. 8A and 8B) may include receiving a voice input of a user through a microphone (e.g., the input module 150 of FIG. 1A, or the microphone 295 of FIG. 1B), transmitting the voice input and context information including information about an application running on the electronic device, to an external server (e.g., the server 108 of FIG. 1A, the intelligence server 200 of FIG. 1B, or the intelligence server 470 of FIG. 4A) through a communication circuit (e.g., the communication module 190 of FIG. 1A, or the communication interface 291 of FIG. 1B), receiving a response to play content corresponding to a category determined based on category priority information from among a plurality of content matching a keyword included in the voice input through the communication circuit, and playing the content through an output device including at least one of a speaker (e.g., the sound output module 155 of FIG. 1A, or the speaker 294 of FIG. 1B) or a display (e.g., the display module 160 of FIG. 1A, or the display 293 of FIG. 1B).

According to an embodiment disclosed in the specification, the plurality of content may include content of a first category supported by the running application and content of a second category not supported by the running application. A priority of the first category may be determined by the external server so as to be higher than a priority of the second category.

According to an embodiment disclosed in the specification, the determined category may be determined based on internet of things (IoT) device information by the external server. The plurality of content may include content of a first category supported by a first IoT device, which is turned on, and content of a second category supported by a second IoT device, which is turned off. A priority of the first category may be determined by the external server so as to be higher than a priority of the second category.

According to an embodiment disclosed in the specification, the determined category may be determined based on a score value for each category by the external server. The score value for each category may include a first score value determined based on preference of a plurality of users for a plurality of categories respectively corresponding to the plurality of content, and a second score value determined based on user historical data of the user for the plurality of categories.

According to an embodiment disclosed in the specification, the determined category may be determined based on a weighted sum score value obtained by applying a weight for each score to the first score value and the second score value and by summing applied results.

The user historical data of the user comprises at least one of a search keyword, a selected category, or a timestamp.

The information about the application running on the electronic device comprises at least one of an indicator that the application is a focused app, an indicator that the application is background app, or an operating state of the application.

The determined category is determined using a concept action network (CAN).

A system including an electronic device and an external server according to another additional embodiment may be provided. The server is configured to receive the voice input and the context information from the electronic device, determine a priority between a plurality of categories respectively corresponding to a plurality of content matching a keyword included in the voice input based on the context information, determine one category among the plurality of categories based on category priority information, transmit the response to play content corresponding to the determined category to the electronic device.

The plurality of content includes content of a first category supported by the running application and content of a second category not supported by the running application, and wherein the server is configured to determine s priority of the first category to be higher than a priority of the second category.

The server is configured to determine the category based on internet of things (IoT) device information.

The plurality of content includes content of a first category supported by a first IoT device, which is turned on, and content of a second category supported by a second IoT device, which is turned off. The server is configured to determine a priority of the first category to be higher than a priority of the second category.

The server is configured to determine the category based on a score value for each category. The score value for each category includes a first score value determined based on preference of a plurality of users for a plurality of categories respectively corresponding to the plurality of content, and a second score value determined based on user historical data of the user for the plurality of categories.

The server is configured to determine the category based on a weighted sum score value obtained by applying a weight for each score to the first score value and the second score value and by summing applied results.

The first score value increases as a time point according to time information associated with each content included in each of the plurality of categories is late.

The second score value includes a score value obtained by calculating the number of times that the user selects each of the plurality of categories, as compared to the number of times that the user selects one of the plurality of categories within a specified section.

A weight for each score applied to the second score value increases as a length of the section decreases.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a microphone;
a communication circuit;
an output device comprising at least one of a speaker or a display;
memory storing one or more computer programs; and
one or more processors communicatively coupled to the microphone, the communication circuit, the output device and the memory,
wherein the one or more computer programs include computer-executable instructions that, when executed by the one or more processors individually or collectively, cause the electronic device to:
receive a voice input of a user through the microphone,
transmit the voice input and context information to an external server through the communication circuit, wherein the context information comprises information about an application running on the electronic device,
receive a response to play content corresponding to a category determined based on category priority information from among a plurality of content matching a keyword included in the voice input and a score value for each category by the external server, from the external server through the communication circuit, wherein the category priority information is determined based on the context information, and
play the content through the output device, and
wherein the score value for each category comprises:
a first score value determined based on preference of a plurality of users for a plurality of categories respectively corresponding to the plurality of content, and
a second score value determined based on user historical data of the user for the plurality of categories.

2. The electronic device of claim 1,
wherein the plurality of content comprises:
content of a first category supported by the running application, and
content of a second category not supported by the running application, and
wherein a priority of the first category is determined by the external server so as to be higher than a priority of the second category.

3. The electronic device of claim 1, wherein the determined category is determined based on internet of things (IoT) device information by the external server.

4. The electronic device of claim 3,
wherein the plurality of content comprises:
content of a first category supported by a first IoT device, which is turned on, and
content of a second category supported by a second IoT device, which is turned off, and
wherein a priority of the first category is determined by the external server so as to be higher than a priority of the second category.

5. The electronic device of claim 1, wherein the determined category is determined based on a weighted sum score value obtained by applying a weight for each score to the first score value and the second score value and by summing applied results.

6. The electronic device of claim 1, wherein the first score value increases as a time point according to time information associated with each content included in each of the plurality of categories is late.

7. The electronic device of claim 1, wherein the second score value comprises a score value obtained by calculating a number of times that the user selects each of the plurality of categories, as compared to a number of times that the user selects one of the plurality of categories within a specified section.

8. The electronic device of claim 7, wherein a weight for each score applied to the second score value increases as a length of the section decreases.

9. An electronic device comprising:
a microphone;
an output device comprising at least one of a speaker or a display;
memory storing one or more computer programs; and
one or more processors communicatively coupled to the microphone, the output device and the memory,
wherein the one or more computer programs include computer-executable instructions that, when executed by the one or more processors individually or collectively, cause the electronic device to:
receive a voice input of a user through the microphone,
determine a priority between a plurality of categories respectively corresponding to a plurality of content matching a keyword included in the voice input based on context information, wherein the context information comprises information about an application running on the electronic device,
determine one category among the plurality of categories based on category priority information and a score value for each category, and play content corresponding to the determined category through the output device, and wherein the score value for each category comprises:
a first score value determined based on preference of a plurality of users for the plurality of categories, and
a second score value determined based on user historical data of the user for the plurality of categories.

10. The electronic device of claim 9,
wherein the plurality of content comprises:
content of a first category supported by the running application, and
content of a second category not supported by the running application, and
wherein the one or more computer programs further include computer-executable instructions that, when executed by the one or more processors individually or collectively, cause the electronic device to:
assign a priority, which is higher than a priority of the second category, to the first category.

11. The electronic device of claim 9, further comprising:
a communication circuit operatively connected to the one or more processors,
wherein the one or more computer programs further include computer-executable instructions that, when executed by the one or more processors individually or collectively, cause the electronic device to:
receive IoT device information from an IoT cloud through the communication circuit, and
determine the priority between the plurality of categories based on the IoT device information.

12. The electronic device of claim 11,
wherein the plurality of content comprises:
content of a first category supported by a first IoT device, which is turned on, and
content of a second category supported by a second IoT device, which is turned off, and
wherein the one or more computer programs further include computer-executable instructions that, when executed by the one or more processors individually or collectively, cause the electronic device to:
assign a priority, which is higher than a priority of the second category, to the first category.

13. The electronic device of claim 9, wherein the one or more computer programs further include computer-executable instructions that, when executed by the one or more processors individually or collectively, cause the electronic device to:
determine the one category based on a weighted sum score value obtained by applying a weight for each score to the first score value and the second score value and by summing applied results.

14. A voice-based content providing method performed by an electronic device, the method comprising:
receiving, by the electronic device, a voice input of a user through a microphone;
transmitting, by the electronic device, the voice input and context information comprising information about an application running on the electronic device, to an external server through a communication circuit;
receiving, by the electronic device, a response to play content corresponding to a category determined based on category priority information from among a plurality of content matching a keyword included in the voice input through the communication circuit; and
playing, by the electronic device, the content through an output device comprising at least one of a speaker or a display,
wherein the determined category is determined based on a score value for each category by the external server, and
wherein the score value for each category comprises:
a first score value determined based on preference of a plurality of users for a plurality of categories respectively corresponding to the plurality of content, and
a second score value determined based on user historical data of the user for the plurality of categories.

15. The method of claim 14,
wherein the plurality of content comprises:
content of a first category supported by the running application, and
content of a second category not supported by the running application, and
wherein a priority of the first category is determined by the external server so as to be higher than a priority of the second category.

16. The method of claim 14,
wherein the determined category is determined based on IoT device information by the external server,
wherein the plurality of content comprises:
content of a first category supported by a first IoT device, which is turned on, and
content of a second category supported by a second IoT device, which is turned off, and
wherein a priority of the first category is determined by the external server so as to be higher than a priority of the second category.

17. The method of claim 14, wherein the determined category is determined based on a weighted sum score value obtained by applying a weight for each score to the first score value and the second score value and by summing applied results.

* * * * *